US010455381B2

(12) United States Patent
Cho et al.

(10) Patent No.: US 10,455,381 B2
(45) Date of Patent: Oct. 22, 2019

(54) APPARATUS AND METHOD FOR PROVIDING FUNCTION OF ELECTRONIC DEVICE CORRESPONDING TO LOCATION

(71) Applicant: SAMSUNG ELECTRONICS CO., LTD., Suwon-si, Gyeonggi-do (KR)

(72) Inventors: Seongho Cho, Seoul (KR); Soyoung Kim, Seoul (KR); Byung Hoon Seo, Suwon-si (KR)

(73) Assignee: Samsung Electronics Co., Ltd., Suwon-si, Gyeonggi-do (KR)

(*) Notice: Subject to any disclaimer, the term of this patent is extended or adjusted under 35 U.S.C. 154(b) by 0 days.

(21) Appl. No.: 15/392,166

(22) Filed: Dec. 28, 2016

(65) Prior Publication Data

US 2017/0195862 A1    Jul. 6, 2017

(30) Foreign Application Priority Data

Jan. 5, 2016    (KR) .................. 10-2016-0000936

(51) Int. Cl.
*H04W 4/18* (2009.01)
*H04W 4/02* (2018.01)
*H04W 72/04* (2009.01)
*H04W 4/021* (2018.01)

(52) U.S. Cl.
CPC .......... *H04W 4/185* (2013.01); *H04W 4/021* (2013.01); *H04W 4/027* (2013.01); *H04W 72/0446* (2013.01)

(58) Field of Classification Search
CPC ....... H04W 4/023; H04W 4/027; H04W 4/02; H04W 4/021; H04W 4/022; H04W 4/029; H04W 4/025; G06Q 10/109; G06Q 10/1093; G06Q 30/0261; H04L 67/18; H04L 67/22

See application file for complete search history.

(56) References Cited

U.S. PATENT DOCUMENTS

| | | | |
|---|---|---|---|
| 9,159,088 B2 | 10/2015 | Dillahunt et al. | |
| 9,179,258 B1* | 11/2015 | Siegel | .................. H04W 4/023 |
| 2009/0005077 A1* | 1/2009 | Forstall | ............. H04M 1/72544 |
| | | | 455/456.2 |
| 2013/0091146 A1 | 4/2013 | Stanger | |
| 2013/0275221 A1 | 10/2013 | Zeto, III et al. | |
| 2014/0297415 A1 | 10/2014 | Chu et al. | |

* cited by examiner

*Primary Examiner* — Nam T Huynh
(74) *Attorney, Agent, or Firm* — Nixon & Vanderhye P.C.

(57) ABSTRACT

Provided is a method and apparatus for providing a function corresponding to a location in an electronic device. The electronic device includes: at least one sensor; a communication module comprising communication circuitry; and a processor, wherein the processor is configured to: obtain location information of the electronic device; obtain, using the at least one sensor, context information associated with a user of the electronic device based on a location corresponding to the location information; determine whether a designated activity occurs with respect to a product or a service corresponding to the location based on the context information; and provide a function associated with the product or the service based on the occurrence of the designated activity.

20 Claims, 16 Drawing Sheets

APPARATUS AND METHOD FOR PROVIDING FUNCTION OF ELECTRONIC DEVICE CORRESPONDING TO LOCATION

CROSS-REFERENCE TO RELATED APPLICATION

This application is based on and claims priority under 35 U.S.C. § 119 to Korean Application Serial No. 10-2016-0000936, which was filed in the Korean Intellectual Property Office on Jan. 5, 2016, the content of which is incorporated by reference herein in its entirety.

TECHNICAL FIELD

The present disclosure relates generally to a method and apparatus for providing a function of an electronic device, for example, it relates to a method and apparatus for providing a function of an electronic device that corresponds to a location.

BACKGROUND

Recording food intake is an important factor for recognizing a user's physical condition. To record a food intake list, a user searches for an eaten food item from a previously stored food item list and inputs the eaten food item, or receives, from a server, a food item list provided in a restaurant where the user eats food, displays the food item list, and selects and inputs one of the displayed food items.

A user may repeat an operation of individually searching a food list and inputting a food item in an electronic device, so as to record the eaten food.

SUMMARY

According to various example embodiments, an electronic device may display data associated with a user activity estimated based on location information, so as to increase the convenience of a user when recording the user activity.

According to various example embodiments, an electronic device may display data associated with a user activity estimated based on location information and user context information, so as to increase the convenience of a user when recording the user activity.

According to various example embodiments, an electronic device is provided, the electronic device including: at least one sensor; a communication module comprising communication circuitry; and a processor configured to: obtain location information corresponding to the electronic device; obtain, using the at least one sensor, context information associated with a user of the electronic device in association with a location corresponding to the location information; determine whether a designated activity occurs with respect to a product or a service corresponding to the location based on at least the context information; and provide a function associated with the product or the service based on at least the occurrence of the designated activity.

According to various example embodiments, there is a method of operating an electronic device is provided, the method including: obtaining location information corresponding to the electronic device; obtaining, using at least one sensor, context information associated with a user of the electronic device in association with a location corresponding to the location information; determining whether a designated activity occurs with respect to a product or a service corresponding to the location based on at least the context information; and providing a function associated with the product or the service based on at least the occurrence of the designated activity.

According to various example embodiments, a computer readable recording medium storing a program for providing operations is provided, the operations including: obtaining location information corresponding to an electronic device; obtaining, using at least one sensor, context information associated with a user of the electronic device in association with a location corresponding to the location information; determining whether a designated activity occurs with respect to a product or a service corresponding to the location based on at least the context information; and providing a function associated with the product or the service based on at least the occurrence of the designated activity.

BRIEF DESCRIPTION OF THE DRAWINGS

The above and other aspects, features, and attendant advantages of the present disclosure will become more apparent and readily appreciated from the following detailed description, taken in conjunction with the accompanying drawings, in which like reference numerals refer to like elements, and wherein.

DETAILED DESCRIPTION

Figure 1:
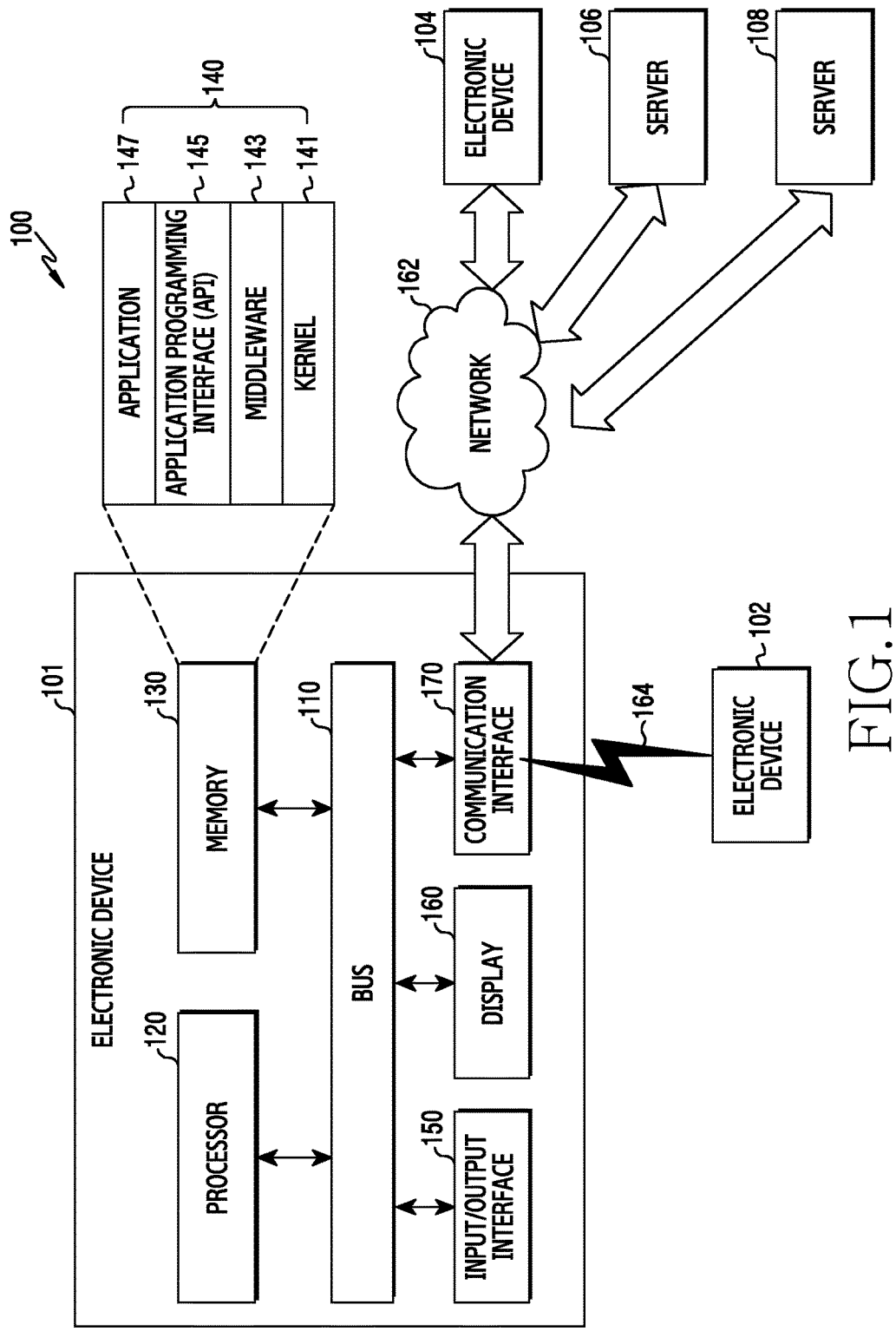
FIG. 1 is a diagram illustrating an example electronic device within a network environment according to various example embodiments of the present disclosure.

Hereinafter, various example embodiments of the present disclosure will be described with reference to the accompanying drawings. However, it should be understood that there is no intent to limit the present disclosure to the particular forms disclosed herein; rather, the present disclosure should be understood to cover various modifications, equivalents, and/or alternatives of embodiments of the present disclosure. In describing the drawings, similar reference numerals may be used to designate similar constituent elements.

As used herein, the expression "have", "may have", "include", or "may include" refers to the existence of a corresponding feature (e.g., numeral, function, operation, or constituent element such as component), and does not exclude one or more additional features.

In the present disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including both at least one A and at least one B.

The expression "a first", "a second", "the first", or "the second" used in various embodiments of the present disclosure may modify various components regardless of the order and/or the importance but does not limit the corresponding components. For example, a first user device and a second user device indicate different user devices although both of them are user devices. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposed between them. On the other hand, it may be understood that when an element (e.g., first element) is referred to as being "directly connected," or "directly coupled" to another element (second element), there are no element (e.g., third element) interposed between them.

The expression "configured to" used in the present disclosure may be used interchangeably with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may refer, for example, to a dedicated processor (e.g. embedded processor) only for performing the corresponding operations or a generic-purpose processor (e.g., central processing unit (CPU) or application processor (AP)) that can perform the corresponding operations by executing one or more software programs stored in a memory device.

The terms used herein are merely for the purpose of describing particular embodiments and are not intended to limit the scope of other embodiments. As used herein, singular forms may include plural forms as well unless the context clearly indicates otherwise. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even if the term is defined in the present disclosure, it should not be interpreted to exclude embodiments of the present disclosure.

An electronic device according to various embodiments of the present disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device, or the like, but is not limited thereto. According to various embodiments, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit), or the like, but is not limited thereto.

According to some embodiments, the electronic device may be a home appliance. The home appliance may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame, or the like, but is not limited thereto.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.), or the like, but is not limited thereto.

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter), or the like, but is not limited thereto. The electronic device according to various embodiments of the present disclosure may be a combination of one or more of the aforementioned various devices. The electronic device according to some embodiments of the present disclosure may be a flexible device. Further, the electronic device according to an embodiment of the present disclosure is not limited to the aforementioned devices, and may include a new electronic device according to the development of technology.

Hereinafter, an electronic device according to various embodiments will be described with reference to the accompanying drawings. As used herein, the term "user" may indicate a person who uses an electronic device or a device (e.g., an artificial intelligence electronic device) that uses an electronic device.

FIG. 1 is a diagram illustrating an example network environment including an electronic device according to various example embodiments of the present disclosure.

An electronic device 101 within a network environment 100, according to various embodiments, will be described with reference to FIG. 1. The electronic device 101 may include a bus 110, a processor (e.g., including processing circuitry) 120, a memory 130, an input/output interface (e.g., including input/output circuitry) 150, a display 160, and a communication interface (e.g., including communication circuitry) 170. In some embodiments, the electronic device 101 may omit at least one of the above elements or may further include other elements.

The bus 110 may include, for example, a circuit for connecting the elements 110-170 and transferring communication (e.g., control messages and/or data) between the elements.

The processor 120 may include various processing circuitry, such as, for example, and without limitation, one or more of a dedicated processor, a Central Processing Unit (CPU), an Application Processor (AP), and a Communication Processor (CP). The processor 120, for example, may carry out operations or data processing relating to control and/or communication of at least one other element of the electronic device 101.

The memory 130 may include a volatile memory and/or a non-volatile memory. The memory 130 may store, for example, instructions or data relevant to at least one other element of the electronic device 101. According to an embodiment, the memory 130 may store software and/or a program 140. The program 140 may include, for example, a kernel 141, middleware 143, an Application Programming Interface (API) 145, and/or application programs (or "applications") 147. At least some of the kernel 141, the middleware 143, and the API 145 may be referred to as an Operating System (OS).

The kernel 141 may control or manage system resources (e.g., the bus 110, the processor 120, or the memory 130) used for performing an operation or function implemented by the other programs (e.g., the middleware 143, the API 145, or the application programs 147). Furthermore, the kernel 141 may provide an interface through which the middleware 143, the API 145, or the application programs 147 may access the individual elements of the electronic device 101 to control or manage the system resources.

The middleware 143, for example, may function as an intermediary for allowing the API 145 or the application programs 147 to communicate with the kernel 141 to exchange data.

In addition, the middleware 143 may process one or more operation requests received from the application program 147 according to priority. For example, the middleware 143 may give priority to use the system resources of the electronic device 101 (for example, the bus 110, the processor 120, the memory 130, and the like) to at least one of the application programs 147. For example, the middleware 143 may perform scheduling or load balancing with respect to the one or more operation requests by processing the one or more operation requests according to the priority given to the at least one application program.

The API 145 is an interface through which the applications 147 control functions provided from the kernel 141 or the middleware 143, and may include, for example, at least one interface or function (e.g., instruction) for file control, window control, image processing, or text control.

The input/output interface 150, for example, may include various input/output circuitry configured to function as an interface that may transfer instructions or data input from a user or another external device to the other element(s) of the electronic device 101. Furthermore, the input/output interface 150 may output the instructions or data received from the other element(s) of the electronic device 101 to the user or another external device.

The display 160 may include, for example, a Liquid Crystal Display (LCD), a Light Emitting Diode (LED) display, an Organic Light Emitting Diode (OLED) display, a Micro Electro Mechanical System (MEMS) display, or an electronic paper display, or the like, but is not limited thereto. The display 160, for example, may display various types of content (e.g., text, images, videos, icons, or symbols) for the user. The display 160 may include a touch screen and receive, for example, a touch, gesture, proximity, or hovering input using an electronic pen or the user's body part.

The communication interface 170, for example, may include various communication circuitry configured to set communication between the electronic device 101 and an external device (e.g., the first external electronic device 102, the second external electronic device 104, or a server 106, 108). For example, the communication interface 170 may be connected to a network 162 through wireless or wired communication to communicate with the external device (e.g., the second external electronic device 104 or the server 106, 108).

The wireless communication may use at least one of, for example, Long Term Evolution (LTE), LTE-Advance (LTE-A), Code Division Multiple Access (CDMA), Wideband CDMA (WCDMA), Universal Mobile Telecommunications System (UNITS), WiBro (Wireless Broadband), and Global System for Mobile Communications (GSM), as a cellular communication protocol. In addition, the wireless communication may include, for example, short range communication 164. The short-range communication 164 may be performed by using at least one of, for example, Wi-Fi, Bluetooth, Bluetooth low energy (BLE), Near Field Communication (NFC), and Global Navigation Satellite System (GNSS). The GNSS may include at least one of, for example, a Global Positioning System (GPS), a Global Navigation Satellite System (Glonass), a Beidou Navigation Satellite System (hereinafter referred to as "Beidou"), and a European Global Satellite-based Navigation System (Galileo), according to a use area, a bandwidth, or the like. Hereinafter, in the present disclosure, the "GPS" may be interchangeably used with the "GNSS". The wired communication may include at least one of, for example, a Universal Serial Bus (USB), a High Definition Multimedia Interface (HDMI), Recommended Standard 232 (RS-232), and a Plain Old Telephone Service (POTS). The network 162 may include at least one of a communication network such as a computer network (e.g., a LAN or a WAN), the Internet, and a telephone network.

Each of the first and second external electronic apparatuses 102 and 104 may be of a type identical to or different from that of the electronic apparatus 101. According to an embodiment, the server 106 may include a group of one or more servers. According to various embodiments, all or some of the operations performed in the electronic device 101 may be performed in another electronic device or a plurality of electronic devices (e.g., the electronic devices 102 and 104 or the server 106). According to an embodiment, when the electronic device 101 has to perform some functions or services automatically or in response to a request, the electronic device 101 may make a request for performing at least some functions relating thereto to another device (e.g., the electronic device 102 or 104 or the server 106, 108) instead of performing the functions or services by itself or in addition. Another electronic apparatus may execute the requested functions or the additional functions, and may deliver a result of the execution to the electronic apparatus 101. The electronic device 101 may process the received result as it is or additionally to provide the requested functions or services. To achieve this, for example, cloud computing, distributed computing, or client-server computing technology may be used.

Figure 2:
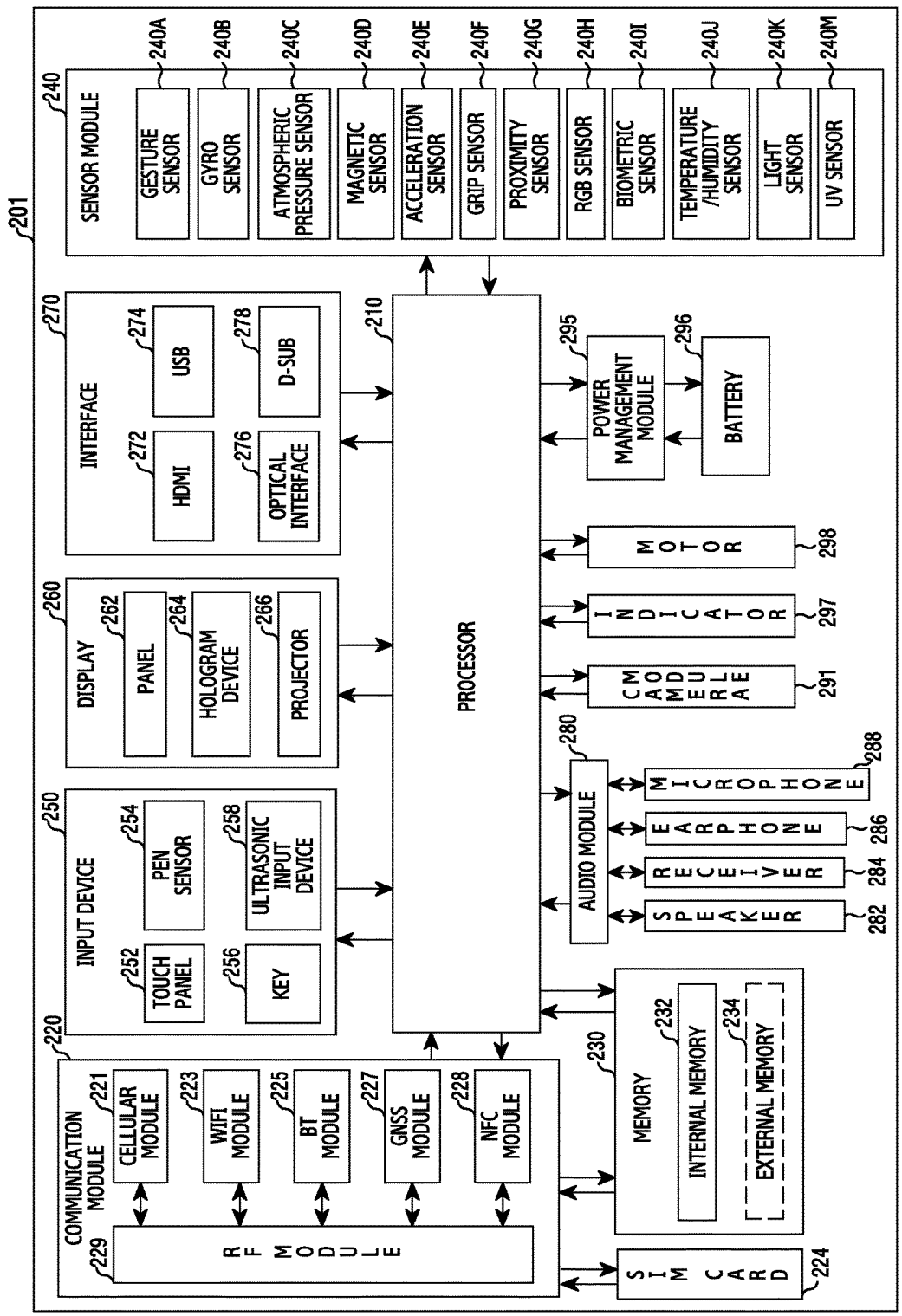
FIG. 2 is a block diagram illustrating an example electronic device according to various example embodiments of the present disclosure.

FIG. 2 is a block diagram illustrating an example electronic device according to various example embodiments of the present disclosure.

FIG. 2 is a block diagram of an electronic device 201 according to various embodiments. For example, the electronic apparatus 201 may include the whole or part of the electronic apparatus 101 illustrated in FIG. 1. The electronic device 201 may include at least one processor (e.g., Application Processor (AP) or various processing circuitry) 210, a communication module (e.g., including communication circuitry) 220, a Subscriber Identification Module (SIM) 224, a memory 230, a sensor module 240, an input device (e.g., including input circuitry) 250, a display 260, an interface (e.g., including interface circuitry) 270, an audio module 280, a camera module 291, a power management module 295, a battery 296, an indicator 297, and a motor 298.

The processor 210 may include various processing circuitry configured to control a plurality of hardware or software components connected to the processor 210 by driving an operating system or an application program and perform processing of various pieces of data and calculations. The processor 210 may be implemented by, for example, a System on Chip (SoC). According to an embodiment, the processor 210 may further include a Graphic Processing Unit (GPU) and/or an image signal processor. The processor 210 may include at least some (e.g., a cellular module 221) of the elements illustrated in FIG. 2. The processor 210 may load, into a volatile memory, instructions or data received from at least one (e.g., a non-volatile memory) of the other elements and may process the loaded instructions or data, and may store various data in a non-volatile memory.

The communication module 220 may have a configuration equal or similar to that of the communication interface 170 of FIG. 1. The communication module 220 may include various communication circuitry, such as, for example, and without limitation, the cellular module 221, a Wi-Fi module 223, a Bluetooth (BT) module 225, a GNSS module 227 (e.g., a GPS module, a Glonass module, a Beidou module, or a Galileo module), an NFC module 228, and a Radio Frequency (RF) module 229.

The cellular module 221 may provide a voice call, image call, a text message service, or an Internet service through, for example, a communication network. According to an embodiment, the cellular module 221 may distinguish between and authenticate electronic devices 201 within a communication network using a subscriber identification module (for example, the SIM card 224). According to an embodiment of the present disclosure, the cellular module 221 may perform at least some of the functions that the processor 210 may provide. According to an embodiment, the cellular module 221 may include a Communication Processor (CP).

Each of the Wi-Fi module 223, the BT module 225, the GNSS module 227, and the NFC module 228 may include, for example, a processor for processing data transmitted and received through the relevant module. According to some embodiments of the present disclosure, at least some (e.g., two or more) of the cellular module 221, the Wi-Fi module 223, the BT module 225, the GNSS module 227, and the NFC module 228 may be included in one Integrated Chip (IC) or IC package.

The RF module 229 may transmit/receive, for example, a communication signal (for example, an RF signal). The RF module 229 may include, for example, a transceiver, a Power Amplifier Module (PAM), a frequency filter, a Low Noise Amplifier (LNA), and an antenna. According to another embodiment of the present disclosure, at least one of the cellular module 221, the Wi-Fi module 223, the BT module 225, the GNSS module 227, and the NFC module 228 may transmit and receive RF signals through a separate RF module.

The subscriber identification module 224 may include, for example, a card including a subscriber identity module and/or an embedded SIM, and may contain unique identification information (e.g., an Integrated Circuit Card Identifier (ICCID)) or subscriber information (e.g., an International Mobile Subscriber Identity (IMSI)).

The memory 230 (for example, the memory 130) may include, for example, an internal memory 232 and/or an external memory 234. The embedded memory 232 may include at least one of a volatile memory (for example, a Dynamic Random Access Memory (DRAM), a Static RAM (SRAM), a Synchronous Dynamic RAM (SDRAM), and the like) and a non-volatile memory (for example, a One Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a flash memory (for example, a NAND flash memory or a NOR flash memory), a hard disc drive, a Solid State Drive (SSD), and the like).

The external memory 234 may further include a flash drive, for example, a Compact Flash (CF), a Secure Digital (SD), a Micro Secure Digital (Micro-SD), a Mini Secure Digital (Mini-SD), an eXtreme Digital (xD), a memory stick, or the like. The external memory 234 may be functionally and/or physically connected to the electronic apparatus 201 through various interfaces.

The sensor module 240 may measure a physical quantity or detect an operation state of the electronic device 201, and may convert the measured or detected information into an electrical signal. For example, the sensor module 240 may include at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (for example, a Red/Green/Blue (RGB) sensor), a biometric sensor 240I, a temperature/humidity sensor 240J, a light sensor 240K, and an Ultra Violet (UV) sensor 240M. Additionally or alternatively, the sensor module 240 may include, for example, an E-nose sensor, an electromyography (EMG) sensor, an electroencephalogram (EEG) sensor, an electrocardiogram (ECG) sensor, an Infrared (IR) sensor, an iris sensor, and/or a fingerprint sensor. The sensor module 240 may further include a control circuit for controlling one or more sensors included therein. In some embodiments of the present disclosure, the electronic apparatus 201 may further include a processor configured to control the sensor module 240 as a part of or separately from the processor 210, and may control the sensor module 240 while the processor 210 is in a sleep state.

The input device 250 may include various input circuitry, such as, for example, and without limitation, a touch panel 252, a (digital) pen sensor 254, a key 256, or an ultrasonic input device 258. The touch panel 252 may use at least one of, for example, a capacitive type, a resistive type, an infrared type, and an ultrasonic type. Also, the touch panel 252 may further include a control circuit. The touch panel 252 may further include a tactile layer and provide a tactile reaction to the user.

The (digital) pen sensor 254 may include, for example, a recognition sheet which is a part of the touch panel or is separated from the touch panel. The key 256 may include, for example, a physical button, an optical key or a keypad. The ultrasonic input device 258 may detect ultrasonic wavers generated by an input tool through a microphone (for example, a microphone 288) and identify data corresponding to the detected ultrasonic waves.

The display 260 (for example, the display 160) may include a panel 262, a hologram device 264 or a projector 266. The panel 262 may include a configuration that is identical or similar to the display 160 illustrated in FIG. 1. The panel 262 may be implemented to be, for example, flexible, transparent, or wearable. The panel 262 and the touch panel 252 may be implemented as one module. The hologram 264 may show a three dimensional image in the air by using an interference of light. The projector 266 may display an image by projecting light onto a screen. The screen may be located, for example, inside or outside the electronic apparatus 201. According to an embodiment, the display 260 may further include a control circuit for controlling the panel 262, the hologram device 264, or the projector 266.

The interface 270 may include various interface circuitry, such as, for example, and without limitation, a High-Definition Multimedia Interface (HDMI) 272, a Universal Serial Bus (USB) 274, an optical interface 276, or a D-subminiature (D-sub) 278. The interface 270 may be included in, for example, the communication interface 170 illustrated in FIG. 1. Additionally or alternatively, the interface 270 may include, for example, a Mobile High-definition Link (MHL) interface, a Secure Digital (SD) card/Multi-Media Card (MMC) interface, or an Infrared Data Association (IrDA) standard interface.

The audio module 280 may bilaterally convert, for example, a sound and an electrical signal. At least some elements of the audio module 280 may be included in, for example, the input/output interface 145 illustrated in FIG. 1. The audio module 280 may process sound information which is input or output through, for example, a speaker 282, a receiver 284, earphones 286, the microphone 288 or the like.

The camera module 291 is a device which may photograph a still image and a dynamic image. According to an embodiment, the camera module 291 may include one or more image sensors (for example, a front sensor or a back sensor), a lens, an Image Signal Processor (ISP) or a flash (for example, LED or xenon lamp).

The power management module 295 may manage, for example, power of the electronic device 201. According to an embodiment, the power management module 295 may include a Power Management Integrated Circuit (PMIC), a charger Integrated Circuit (IC), or a battery or fuel gauge. The PMIC may use a wired and/or wireless charging method. Examples of the wireless charging method may include, for example, a magnetic resonance method, a magnetic induction method, an electromagnetic method, and the like. Additional circuits (e.g., a coil loop, a resonance circuit, a rectifier, etc.) for wireless charging may be further included. The battery gauge may measure, for example, a residual quantity of the battery 296, and a voltage, a current, or a temperature during the charging. The battery 296 may include, for example, a rechargeable battery or a solar battery.

The indicator 297 may display a particular state (e.g., a booting state, a message state, a charging state, or the like) of the electronic apparatus 201 or a part (e.g., the processor 210). The motor 298 may convert an electrical signal into mechanical vibration, and may generate vibration, a haptic effect, or the like. Although not illustrated, the electronic apparatus 201 may include a processing unit (e.g., a GPU) for supporting a mobile television (TV). The processing unit for supporting mobile TV may, for example, process media data according to a certain standard such as Digital Multimedia Broadcasting (DMB), Digital Video Broadcasting (DVB), or mediaFLO™.

Each of the above-described component elements of hardware according to the present disclosure may be configured with one or more components, and the names of the corresponding component elements may vary based on the type of electronic device. The electronic device according to various embodiments of the present disclosure may include at least one of the aforementioned elements. Some elements may be omitted or other additional elements may be further included in the electronic device. Also, some of the hardware components according to various embodiments may be combined into one entity, which may perform functions identical to those of the relevant components before the combination.

Figure 3:
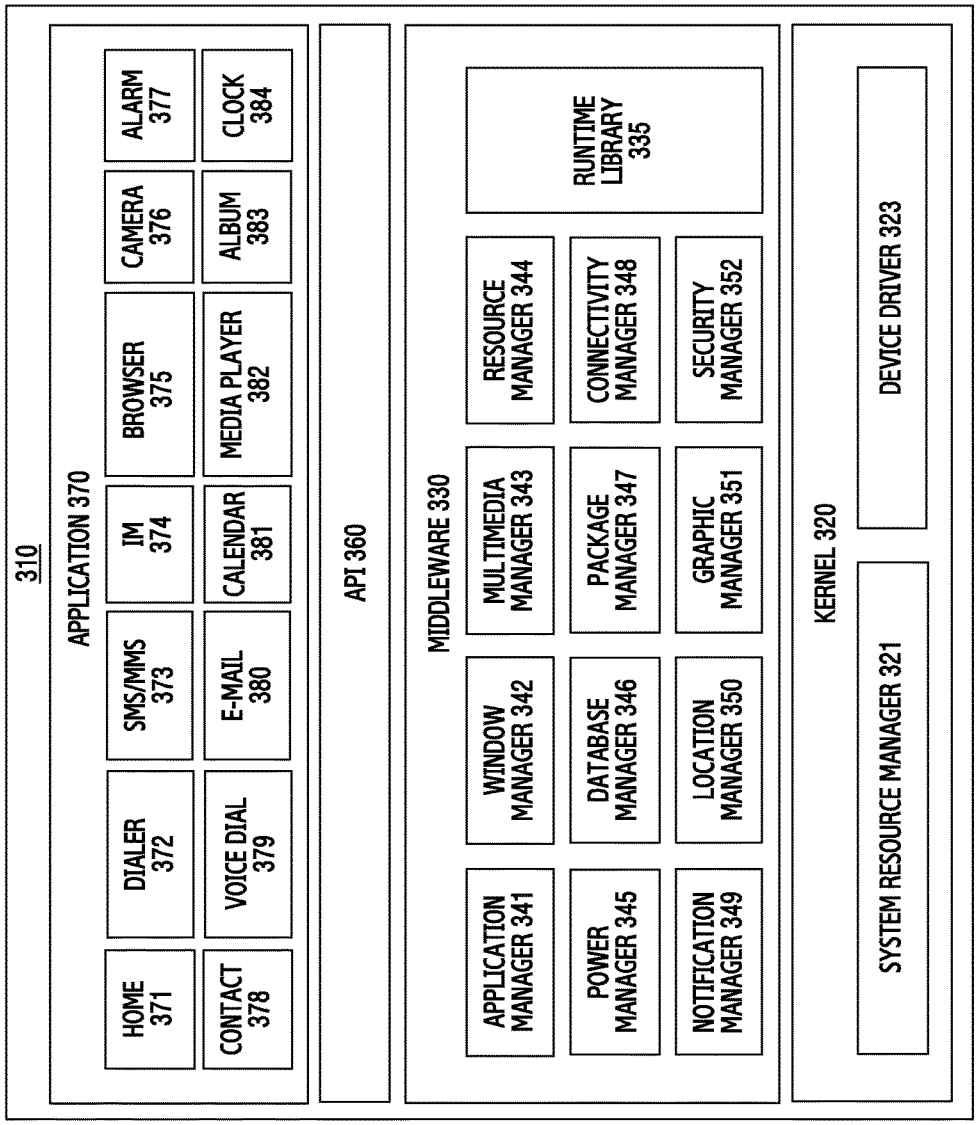
FIG. 3 is a block diagram illustrating an example program module according to various example embodiments of the present disclosure.

FIG. 3 is a block diagram illustrating an example program module according to various example embodiments of the present disclosure.

According to an embodiment, the program module 310 (for example, the program 140) may include an Operating System (OS) for controlling resources related to the electronic device (for example, the electronic device 101) and/or various applications (for example, the application programs 147) executed in the operating system. The operating system may be, for example, Android, iOS, Windows, Symbian, Tizen, Bada, or the like.

The program module 310 may include a kernel 320, middleware 330, an API 360, and/or an application 370. At least some of the program module 310 may be preloaded on the electronic apparatus, or may be downloaded from an external electronic apparatus (e.g., the electronic apparatus 102 or 104, or the server 106).

The kernel 320 (e.g., the kernel 141) may include, for example, a system resource manager 321 and/or a device driver 323. The system resource manager 321 may perform the control, allocation, retrieval, or the like of system resources. According to an embodiment of the present disclosure, the system resource manager 321 may include a process manager, a memory manager, a file system manager, or the like. The device driver 323 may include, for example, a display driver, a camera driver, a Bluetooth driver, a shared memory driver, a USB driver, a keypad driver, a Wi-Fi driver, an audio driver, or an Inter-Process Communication (IPC) driver.

The middleware 330 may provide a function required by the applications 370 in common or provide various functions to the applications 370 through the API 360 so that the applications 370 can efficiently use limited system resources within the electronic device. According to an embodiment, the middleware 330 (for example, the middleware 143) may include, for example, at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include a library module that a compiler uses in order to add a new function through a programming language while the applications 370 are being executed. The runtime library 335 may perform input/output management, memory management, the functionality for an arithmetic function, or the like.

The application manager 341 may manage, for example, the life cycle of at least one of the applications 370. The window manager 342 may manage Graphical User Interface (GUI) resources used for the screen. The multimedia manager 343 may determine a format required to reproduce various media files, and may encode or decode a media file by using a coder/decoder (codec) appropriate for the relevant format. The resource manager 344 may manage resources, such as a source code, a memory, a storage space, and the like of at least one of the applications 370.

The power manager 345 may operate together with a Basic Input/Output System (BIOS) to manage a battery or power and may provide power information required for the operation of the electronic device. The database manager 346 may generate, search for, and/or change a database to be used by at least one of the applications 370. The package manager 347 may manage the installation or update of an application distributed in the form of a package file.

The connectivity manager 348 may manage a wireless connection such as, for example, Wi-Fi or Bluetooth. The notification manager 349 may display or notify of an event, such as an arrival message, an appointment, a proximity notification, and the like, in such a manner as not to disturb the user. The location manager 350 may manage location information of the electronic apparatus. The graphic manager 351 may manage a graphic effect, which is to be provided to the user, or a user interface related to the graphic effect. The security manager 352 may provide various security functions required for system security, user authentication, and the like. According to an embodiment of the present disclosure, when the electronic apparatus (e.g., the electronic apparatus 101) has a telephone call function, the middleware 330 may further include a telephony manager for managing a voice call function or a video call function of the electronic apparatus.

The middleware 330 may include a middleware module that forms a combination of various functions of the above-described elements. The middleware 330 may provide a module specialized for each type of OS in order to provide a differentiated function. Also, the middleware 330 may dynamically delete some of the existing elements, or may add new elements.

The API 360 (e.g., the API 145) is, for example, a set of API programming functions, and may be provided with a different configuration according to an OS. For example, in the case of Android or iOS, one API set may be provided for each platform. In the case of Tizen, two or more API sets may be provided for each platform.

The applications 370 (for example, the application program 147) may include, for example, one or more applications which can provide functions such as home 371, dialer 372, SMS/MMS 373, Instant Message (IM) 374, browser 375, camera 376, alarm 377, contact 378, voice dial 379, email 380, calendar 381, media player 382, album 383, clock 384, health care (for example, measure exercise quantity or blood sugar), or environment information (for example, atmospheric pressure, humidity, or temperature information).

According to an embodiment of the present disclosure, the applications 370 may include an application (hereinafter, referred to as an "information exchange application" for convenience of description) supporting information exchange between the electronic apparatus (e.g., the electronic apparatus 101) and an external electronic apparatus (e.g., the electronic apparatus 102 or 104). The application associated with information exchange may include, for example, a notification relay application for forwarding specific information to an external electronic device, or a device management application for managing an external electronic device.

For example, the notification relay application may include a function of delivering, to the external electronic apparatus (e.g., the electronic apparatus 102 or 104), notification information generated by other applications (e.g., an SMS/MMS application, an email application, a health care application, an environmental information application, etc.) of the electronic apparatus 101. Further, the notification relay application may receive notification information from, for example, an external electronic device and provide the received notification information to a user.

The device management application may manage (for example, install, delete, or update), for example, a function for at least a part of the external electronic device (for example, the electronic device 102 or 104) communicating with the electronic device (for example, turning on/off the external electronic device itself (or some elements thereof) or adjusting brightness (or resolution) of a display), applications executed in the external electronic device, or services provided from the external electronic device (for example, a telephone call service or a message service).

According to an embodiment, the applications 370 may include applications (for example, a health care application of a mobile medical appliance or the like) designated according to attributes of the external electronic device 102 or 104. According to an embodiment of the present disclosure, the application 370 may include an application received from the external electronic apparatus (e.g., the server 106, or the electronic apparatus 102 or 104). According to an embodiment of the present disclosure, the application 370 may include a preloaded application or a third party application which can be downloaded from the server. Names of the elements of the program module 310, according to the above-described embodiments of the present disclosure, may change depending on the type of OS.

According to various embodiments of the present disclosure, at least some of the program module 310 may be implemented in software, firmware, hardware, or a combination of two or more thereof. At least some of the program module 310 may be implemented (e.g., executed) by, for example, the processor (e.g., the processor 210). At least some of the program module 310 may include, for example, a module, a program, a routine, a set of instructions, and/or a process for performing one or more functions.

The term "module" as used herein may, for example, refer to a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module' may be a minimum unit for performing one or more functions or a part thereof. The "module" may be mechanically or electronically implemented. For example, the "module" according to the present disclosure may include at least one of a dedicated processor, a CPU, an Application-Specific Integrated Circuit (ASIC) chip, a Field-Programmable Gate Arrays (FPGA), and a programmable-logic device for performing operations which has been known or are to be developed hereinafter.

According to various embodiments, at least some of the devices (for example, modules or functions thereof) or the method (for example, operations) according to the present disclosure may be implemented by a command stored in a computer-readable storage medium in a programming module form. The instruction, when executed by a processor (e.g., the processor 120), may cause the one or more processors to execute the function corresponding to the instruction. The computer-readable storage medium may be, for example, the memory 130.

Figure 4:
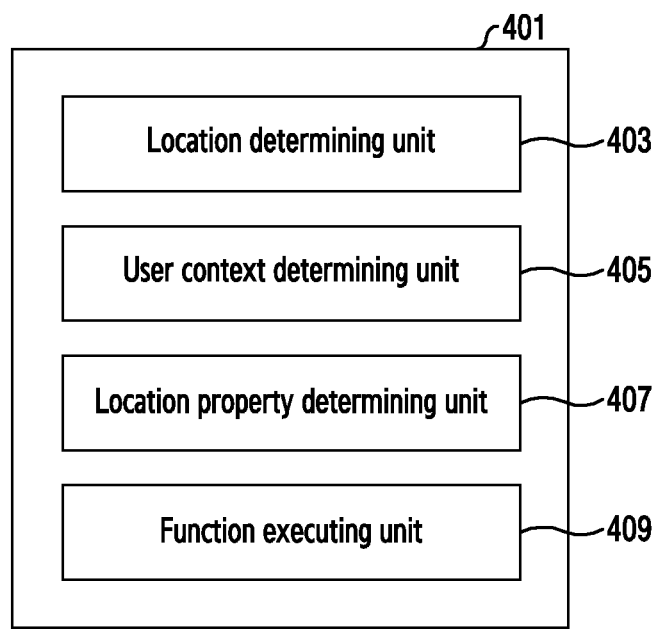
FIG. 4 is a block diagram illustrating an example processor according to various example embodiments of the present disclosure.

FIG. 4 is a block diagram illustrating an example processor according to various example embodiments of the present disclosure.

Referring to FIG. 4, a processor 401 may perform, for example, some or all of the functions of the processor 210 of FIG. 2. The processor 401 may include a location determining unit 403, a user context determining unit 405, a location property determining unit 407, and a function executing unit 409. Each of these units may be implemented using corresponding program modules, circuitry, hardware, software, firmware, or any combination thereof.

The location determining unit 403 may obtain location information indicating a location of an electronic device (e.g., the electronic device 101). For example, the location information may include the longitude and the latitude of the corresponding location. According to an embodiment, the location determining unit 403 may obtain location information (e.g., first location information) at a predetermined time (e.g., a first time 503 of FIG. 5A). For example, the predetermined time may be determined by a user or based on location history records. According to an embodiment, the location determining unit 403 may obtain location information and may transmit the same to the user context determining unit 403 in response to a request from the user context determining unit 403.

The user context determining unit 405 may obtain user context information at a predetermined time slot. According to an embodiment, the user context determining unit 405 may sense one or more out of a movement, a pose, or an orientation of the electronic device 101 (or a user) using a motion sensor, and may obtain movement information including a result of sensing. According to an embodiment, the user context determining unit 405 may measure an adjacent environment state of the electronic device 101 using an environment sensor, and may obtain adjacent environment information including a result of the measurement. According to an embodiment, the user context determining unit 405 may measure a user's physical condition using a biometric sensor, and may obtain biometric information including a result of the measurement.

The user context determining unit 405 may determine whether a predetermined condition is satisfied based on user context information during a predetermined time slot, and may request location information from the location determining unit 403 based on a result of the determination. In response to the request, the user context determining unit 405 may receive location information from the location determining unit 403. For example, the predetermined condition may be a condition associated with a movement of the electronic device 101 (or a user). For example, the predetermined condition may indicate that the electronic device 101 (or a user) moves and stops during a predetermined period of time. For example, when a predetermined condition is satisfied, the user context determining unit 405 may request the location information from the location determining unit 403 at a time (a second time 505 of FIG. 5A) when the predetermined condition is satisfied, and may receive location information (e.g., second location information) corresponding to the request time from the location determining unit 403.

For example, the second time may be included in a predetermined time slot, and may be a predetermined time after the first time. For example, the predetermined time slot may be determined in advance by a user or may be determined based on location history records. For example, the predetermined time slot may be a time slot when a predetermined activity of a user occurs. For example, the predetermined time slot may be a time slot when a user activity of having a meal occurs. For example, the predetermined time slot may be one of a breakfast time slot, a lunch time slot, and supper time slot. The user context determining unit 405 may obtain a user activity based on the obtained user context information, and may transmit user activity information including the obtained user activity to the function executing unit 409. For example, the user activity information may be information indicating a user activity performed in a predetermined location of the electronic device 101. For example, when adjacent environment information includes scent information, the user context determining unit 405 may analyze the scent information and determine whether the scent of an adjacent environment is the scent of food. When a result of the determination shows that the scent of the adjacent environment is the scent of food, the user context determining unit 405 may determine the user activity as food intake activity. For example, the scent information may be obtained through a gas sensor or an olfactory sensor.

As another example, when the adjacent environment information includes scent information, the user context determining unit 405 may analyze the scent information, and determine a type of food provided in a corresponding location. The user context determining unit 405 may determine the user activity as food intake activity in association with the determined type of food.

As another example, when the adjacent environment information includes an adjacent environment image, the user context determining unit 405 may analyze the adjacent environment image, and may determine whether food is included in the adjacent environment image. When a result of the determination shows that food is included in the adjacent environment image, the user context determining unit 405 may determine the user activity as food intake activity.

According to an embodiment, the user context determining unit 405 may analyze biometric information out of the user context information, and may estimate a user activity performed in a location corresponding to location information. For example, when the biometric information includes blood sugar information, the user context determining unit 405 may analyze the blood sugar information, and may determine whether a blood sugar level increases. When a result of the determination shows that a blood sugar level increases, the user context determining unit 405 may determine the user activity as food intake activity.

As another example, when the biometric information includes calorie information, the user context determining unit 405 may analyze the calorie information, and may determine whether calorie increases. When a result of the determination shows that the calorie increases, the user context determining unit 405 may determine the user activity as food intake activity.

As another example, when the biometric information includes user emotion state information, the user context determining unit 405 may analyze the user emotion state information, and may determine the emotion state of a user (e.g., sad, angry, gloomy, joyful, delighted, satisfied, or the like). When the determined emotion state is at least one of a joyful state, a delighted state, a satisfied state, and a user is intended to be happy when feeling full and satisfied with having food, the user context determining unit 405 may determine the user activity as food intake activity.

According to an embodiment, based on a property of a predetermined location, the user context determining unit 405 may estimate a user activity performed in the corresponding location, and may transmit user activity information including the estimated user activity to the function executing unit 409. For example, the user context determining unit 405 may determine whether first location information is identical to second location information. For example, the user context determining unit 405 may determine whether the longitude and the latitude of the first location information are identical to the longitude and the latitude of the second location information.

When the first location information is different from the second location information, the user context determining unit 405 may determine that a user moves to a predetermined location and performs a predetermined activity, and may estimate a user activity based on POI information corresponding to the second location information. For example, when a property of a second location indicates a restaurant, the user context determining unit 405 may estimate a user activity at the second location as food intake activity (e.g., an activity of having a meal).

When the first location information is identical to the second location information, the user context determining unit 405 may determine that a user does not move to a predetermined location, and may request the location determining unit 403 to obtain location information during the remaining time slot after excluding a second time from the predetermined time slot. Subsequently, when the user context determining unit 405 receives location information associated with a predetermined time (e.g., a third time 517 of FIG. 5B) from the location determining unit 403, the user context determining unit 405 may repeat the above described operation to determine whether a user moves to a predetermined location and performs a predetermined activity.

According to an embodiment, the user context determining unit 405 may estimate a user activity performed at a predetermined location based on a property of a predetermined location and user context information. For example, the user context determining unit 405 may determine whether first location information is identical to second location information.

When the first location information is different from the second location information, the user context determining unit 405 may estimate a user activity based on user context information and a location property included in POI information corresponding to the second location information. For example, when a location property of the second location information indicates a place associated with food, and a result of analyzing user context information corresponding to the second location information indicates food intake, the user context determining unit 405 may determine the user activity as food intake activity.

According to an embodiment, the user context determining unit 405 may estimate a user activity performed in a predetermined location based on a property of the predetermined location and a location change from the predetermined location to another location.

Figure 6A:
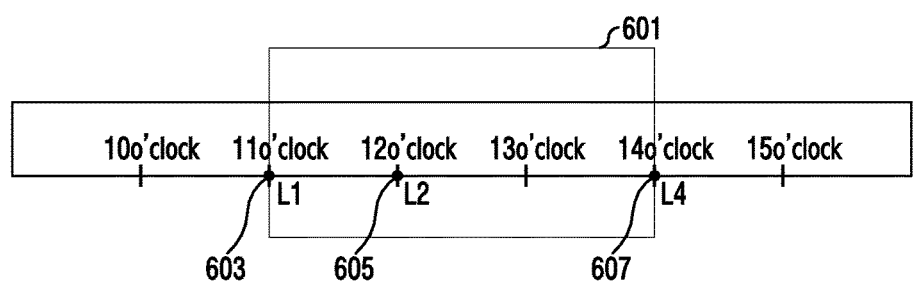
FIGS. 6A and 6B are graphs in association with obtaining location information in an electronic device.

For example, the user context determining unit 405 may determine whether first location information is identical to second location information. When the first location information is different from the second location information, the user context determining unit 405 may receive fourth location information corresponding to a fourth time from the location determining unit 403. For example, the fourth time may be a time at the end of a predetermined time slot, or a time after the predetermined time slot. For example, the fourth time may be 14 o'clock, which is a time 607 at the end of a predetermined time slot 601, as illustrated in FIG. 6A.

The user context determining unit 405 may determine whether the second location information is identical to the fourth location information. For example, when the second location information is identical to the fourth location information, the user context determining unit 405 may determine that a user moves from a first location to a second location, and does not perform a predetermined activity at the second location, and may terminate an operation of performing a predetermined function associated with the location.

As another example, when the second location information is different from the fourth location information, the user context determining unit 405 may determine that a user moves from the first location to the second location, performs a predetermined activity at the second location, and moves to a fourth location. The user context determining unit 405 may estimate user activity based on a property of the second location included in POI information corresponding to the second location information. For example, when the property of the second location indicates a restaurant, the user context determining unit 405 may estimate the user activity at the second location as food intake activity (e.g., an activity of having a meal).

The location property determining unit 407 may obtain point of interest (POI) information corresponding to location information, and may determine a property of a location indicated by the location information based on the obtained POI information. For example, the POI information may include a location property and a service list provided in a corresponding location. For example, the service list provided in the corresponding location may be a food item list.

According to an embodiment, the location property determining unit 407 may request, from a server (e.g., the server 106), POI information corresponding to predetermined location information (e.g., second location information corresponding to a second time), and may receive the POI information corresponding to the predetermined location information in response to the request. The location property determining unit 407 may determine a location property by analyzing the POI information corresponding to the predetermined location information. For example, when a result of analyzing POI information corresponding to the second location information shows that a category of the POI information is a restaurant, the location property determining unit 407 may determine a property of a location corresponding to the second location information as a restaurant.

The location property determining unit 407 may transmit the determined location property to the user context determining unit 405.

The function executing unit 409 may execute a function associated with a location of the electronic device 101, from among a plurality of functions. For example, when an estimated user activity is food intake activity, the function executing unit 409 may determine a service provided in a corresponding location as a food providing service, and may execute a function associated with a service of providing the determined food. For example, the function associated with the food providing service may be displaying at least one food item list provided in a corresponding location, and determining and storing an item, which is selected by a user from the displayed food item list, as food eaten in the corresponding location.

According to an embodiment, when the location of the electronic device 101 corresponds to a designated place (e.g., a theater or clothing store), the function executing unit 409 may execute a function associated with the designated place. For example, when the designated place is set to a theater, and the location of the electronic device 101 is a theater, the function executing unit 409 may execute an application for writing a review of the theater. For example, when the designated place is set to a clothing store, and the location of the electronic device 101 is a clothing store, the function executing unit 409 may execute an application for recommending clothes for a user.

According to an embodiment, the function executing unit 409 may receive user activity information from the user context determining unit 405, and may provide at least one function out of a plurality of functions based on the received user activity information.

According to an embodiment, an electronic device may include at least one sensor, a communication module, and a processor. The processor may: obtain location information corresponding to the electronic device; obtain, using the at least one sensor, context information associated with a user of the electronic device in association with a location corresponding to the location information; determine whether a designated activity occurs with respect to a product or a service corresponding to the location based on at least the context information; and provide a function associated with the product or the service based on at least the occurrence of the designated activity.

According to an embodiment, the processor may determine that the designated activity occurs when a variation of the location information is less than a designated variation during a designated period of time.

According to an embodiment, the processor may obtain movement information of the electronic device, and may determine that the designated activity occurs when the movement information corresponds to a designated movement.

According to an embodiment, the processor may display a list associated with the product or the service.

According to an embodiment, the processor may obtain a list associated with the product or the service from an external electronic device through the communication module.

According to an embodiment, the location information includes first location information and second location information, and the processor may obtain the first location information at a designated first time using the at least one sensor, may obtain the second location information corresponding to a location that satisfies a predetermined condition during a predetermined time slot after the first time, and may determine whether the designated activity occurs based on the first location information and the second location information.

According to an embodiment, the processor may obtain a property of a location corresponding to the second location information when the first location information is different from the second location information, and may determine that the designated activity occurs when the location property is a location property associated with the designated activity.

According to an embodiment, the processor may obtain third location information after the predetermined time slot when the first location information is different from the second location information, and may determine whether the designated activity occurs based on a result of comparison between the second location information and the third location information.

According to an embodiment, the processor may obtain a property of a location corresponding to the second location information when the second location information is different from the third location information, and may determine that the designated activity occurs when the location property is associated with the designated activity.

According to an embodiment, the function associated with the product or the service may be a function of displaying a food item list provided in the location.

Figure 5A:
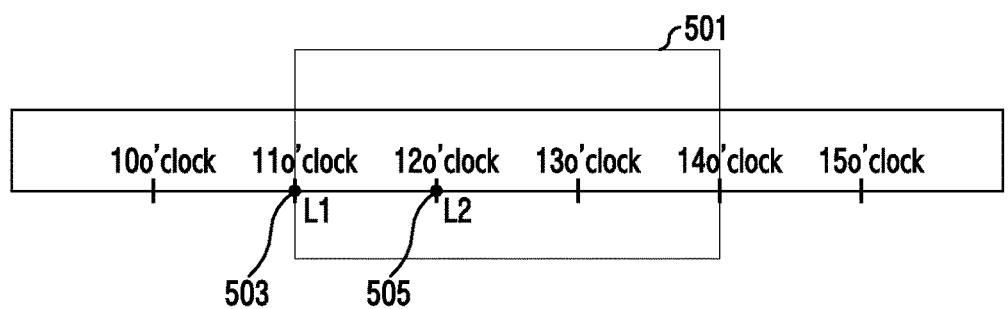
FIGS. 5A and 5B are graphs in association with obtaining location information in an electronic device.
Figure 5B:
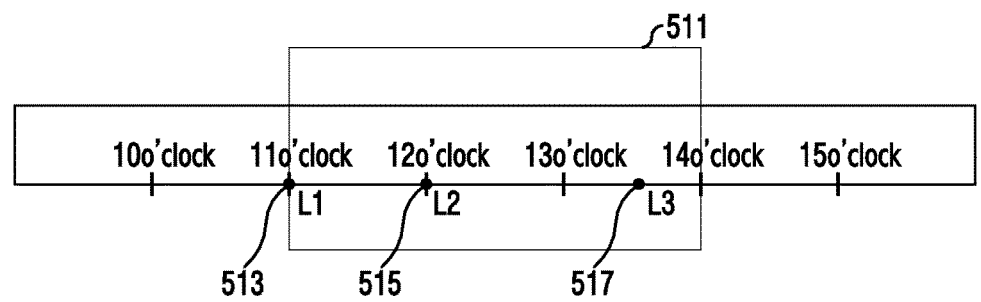

FIGS. 5A and 5B are graphs in association with obtaining location information in an electronic device. The electronic device may be, for example, the electronic device 101 of FIG. 1.

Referring to FIG. 5A, the electronic device 101 may obtain first location information corresponding to a first time 503, and second location information corresponding to a second time 505. Also, the electronic device 101 may determine whether a user moves for a meal-having activity at a second time 505 of a lunch time slot 501 based on user context information (e.g., movement information) from a first time 503 to the second time 505.

According to an embodiment, the electronic device 101 may obtain first location information at the first time 503. Also, based on movement information, the electronic device 101 may determine whether a user stops during a predetermined period of time. For example, the predetermined period of time may be an average amount of time expended when the user has a meal, for example, 10 minutes.

For example, when it is determined that electronic device 101 stops during a predetermined period of time (e.g., an hour) after the first time 503 (e.g., 11 o'clock), the electronic device 101 may obtain second location information corresponding to the second time 505 (e.g., 12 o'clock). For example, the electronic device 101 may determine whether the electronic device 101 stops during a predetermined period of time based on movement information included in user context information (e.g., a variation in a movement of the electronic device 101 or a user).

The electronic device 101 may compare the first location information and the second location information, and may determine whether to estimate user activity based on a comparison result. For example, when the first location information is different from the second location information, it is determined that a user moves from a first location to a second location to have lunch. As another example, when the first location information is the same as the second location information, it is determined that a user does not move from the first location to another location to have lunch.

Referring to FIG. 5B, when first location information corresponding to a first time 513 and second location information corresponding to a second time 515 are identical, the electronic device 101 may determine whether a user stops during a predetermined period of time based on movement information until a lunch time slot 511 elapses.

For example, when it is determined that the electronic device 101 stops during a predetermined period of time (e.g., an hour) after the second time 515 (e.g., 12 o'clock), the electronic device 101 may obtain third location information corresponding to a third time 517 (e.g., 13:30). The electronic device 101 may compare the first location information and the third location information, and may determine whether to estimate user activity based on a comparison result. For example, when the first location information is different from the third location information, it is determined that the user moves from a first location to a third location for having lunch. As another example, when the first location information is the same as the third location information, it is determined that the user does not move from the first location to another location to have lunch.

The electronic device 101 may determine whether the user moves from the first location to another location by repeating the operation, until the lunch time slot 511 elapses.

Figure 6B:
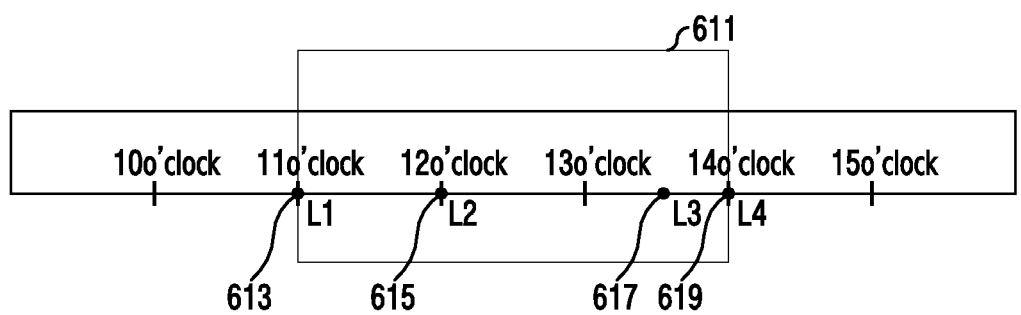

FIGS. 6A and 6B are graphs in association with obtaining location information in an electronic device. The electronic device may be, for example, the electronic device 101 of FIG. 1.

Referring to FIG. 6A, the electronic device 101 may obtain first location information corresponding to a first time 603, second location information corresponding to a second time 605, and fourth location information corresponding to a fourth time 607. Also, the electronic device 101 may determine whether a user moves for a meal-having activity at the second time 605 of a lunch time slot 601 based on user context information (e.g., movement information) from the first time 603 to the second time 605.

According to an embodiment, the electronic device 101 may obtain the first location information at the first time 603 (e.g., 11 o'clock). Based on movement information, the electronic device 101 may determine whether the user stops during a predetermined period of time.

For example, when it is determined that the electronic device 101 stops during a predetermined period of time (e.g., an hour) after the first time 603 (e.g., 11 o'clock), the electronic device 101 may obtain the second location information corresponding to the second time 605 (e.g., 12 o'clock).

The electronic device 101 may compare the first location information and the second location information. When the first location information and the second location information are different from each other, the electronic device 101 may obtain fourth location information indicating a location of the electronic device 101 at a fourth time 607, which is a time at the end of the lunch time slot 601 or a time after the lunch time slot 601.

The electronic device 101 may compare the second location information and the fourth location information, and may determine whether to estimate user activity based on a comparison result. For example, when the second location information is different from the fourth location information, it is determined that there is high probability that the user moves from a first location to a second location to have lunch. As another example, when the second location information is the same as the fourth location information, the electronic device 101 determines that there is high probability that the user does not move from the first location to the second location to have lunch.

Referring to FIG. 6B, when first location information corresponding to a first time 613 and second location information corresponding to a second time 615 are identical, the electronic device 101 may determine whether a user stops during a predetermined period of time based on movement information until a lunch time slot 611 elapses.

For example, when it is determined that the electronic device 101 stops during a predetermined period of time (e.g., an hour) after the second time 615 (e.g., 12 o'clock), the electronic device 101 may obtain third location information corresponding to a third time 617 (e.g., 13:30). The electronic device 101 may compare the first location information and the third location information. When the first location information and the third location information are different from each other, the electronic device 101 may obtain fourth location information indicating a location of the electronic device 101 at a fourth time 619.

The electronic device 101 may compare the third location information and the fourth location information, and may determine whether to estimate user activity based on a comparison result. For example, when the third location information is different from the fourth location information, the electronic device 101 may determine that there is high probability that the user moves from a first location to a third location to have lunch. As another example, when the third location information is the same as the fourth location information, the electronic device 101 may determine that there is high probability that the user does not move from the first location to the third location to have lunch.

Figure 7:
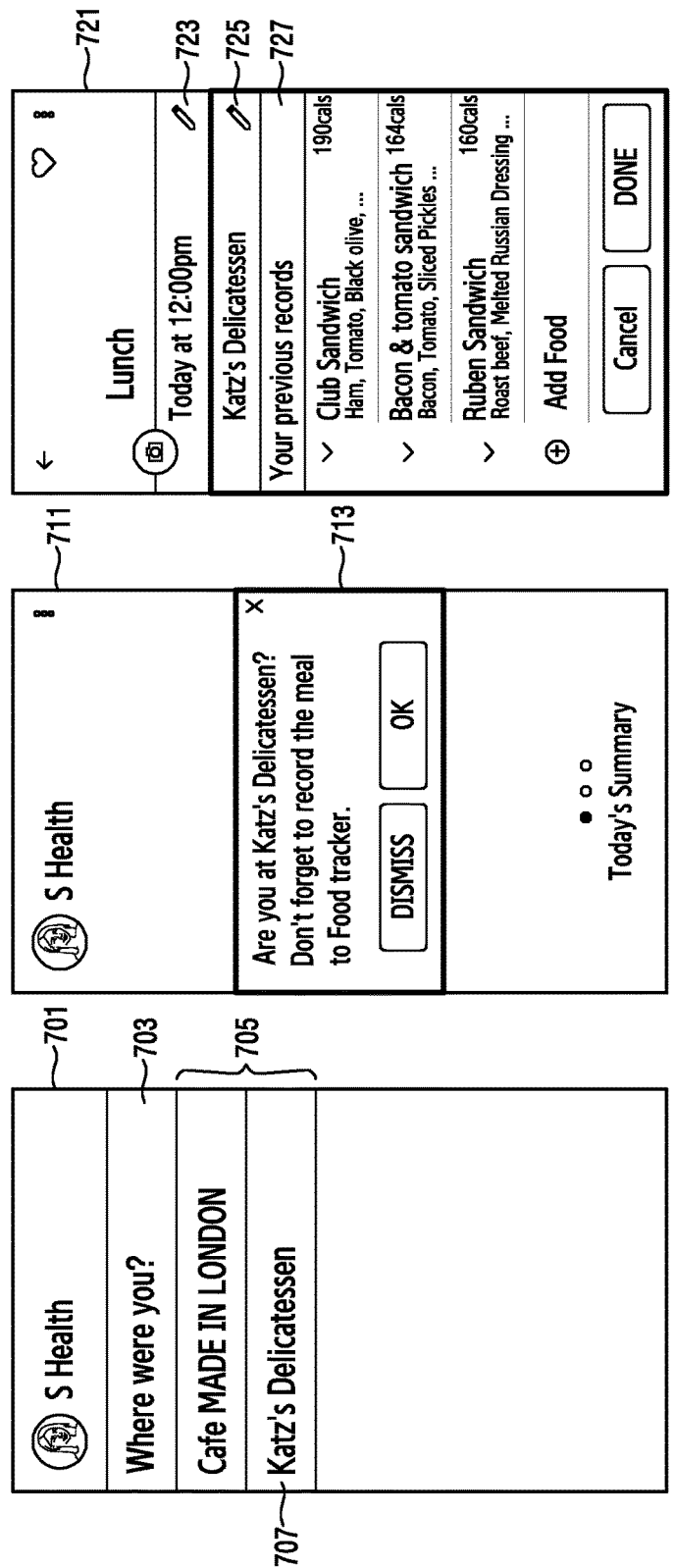
FIG. 7 is a diagram illustrating an example in which an electronic device outputs a food item list of a predetermined restaurant according to example embodiments of the present disclosure.

FIG. 7 is a diagram illustrating an example in which an electronic device outputs a food item list of a predetermined restaurant. The electronic device may be, for example, the electronic device 101 of FIG. 1.

Referring to FIG. 7, the electronic device 101 may display a food item list provided in a place based on location information of the electronic device 101. For example, when the electronic device 101 receives POI information corresponding to predetermined location information from a server (e.g., the server 106), the electronic device 101 may detect the name of at least one place located at or around a predetermined location based on the POI information. When names of a plurality of places are detected, the electronic device 101 may display the plurality of place names 705 together with a sentence 703 inquiring about a location of a user, as shown in a screen 701.

When one of the plurality of place names, for example, Katz's Delicatessen 707, is selected by a user, the electronic device 101 may display a sentence 713 for recommending the recording of eaten food, as shown in a screen 711. When the user allows to record eaten food, the electronic device 101 may display a time 723 when predetermined location information 725 is obtained and a food item list 727 provided in a corresponding place, as shown in a screen 721.

For example, the electronic device 101 may detect and display the food item list 727 of the corresponding place based on previously stored user location history records. As another example, the electronic device 101 may detect and display a food item list of a selected place from the received POI information. As another example, the electronic device 101 may request, from a server (e.g., the server 108) that provides a food item list, a food item list of a selected place, and may receive and display the food item list of the selected place from the server 108.

Figure 8:
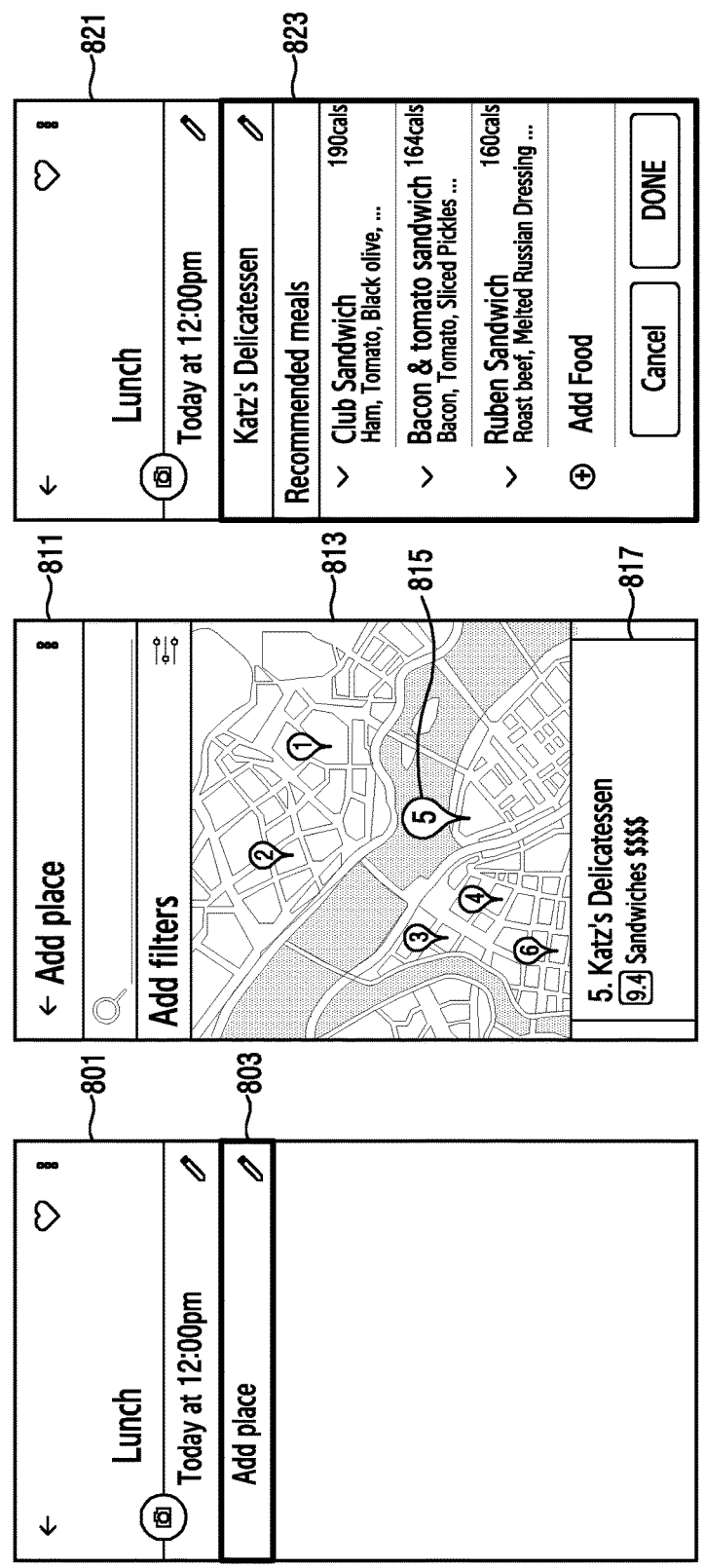
FIG. 8 is a diagram illustrating an example in which an electronic device outputs a food item list of a predetermined restaurant according to example embodiments of the present disclosure.

FIG. 8 is a diagram illustrating an example in which an electronic device outputs a food item list of a predetermined restaurant. The electronic device may be, for example, the electronic device 101 of FIG. 1.

Referring to FIG. 8, the electronic device 101 may display a food item list provided in a place selected by a user. For example, when a food intake record menu is selected by the user, the electronic device 101 may display a place selection menu 803 for enabling the user to directly select a place where the user eats food, as shown in a screen 801.

When the place selection menu 803 is selected by the user, the electronic device 101 may display a map 813 including icons indicating a plurality of places around the current location of the electronic device 101 as shown in a screen 811. When one icon 815 is selected by the user from among the plurality of icons, the electronic device 101 may display detailed descriptions 817 (e.g., a place name and a representative food item) of a place corresponding to the selected icon 815.

When a predetermined place is selected by the user (e.g., a single touch or double touches on the selected icon 815, or a single touch or double touches on the detailed descriptions 817 of a place), the electronic device 101 may display a food item list 823 provided in the selected place as shown in a screen 821.

Figure 9:
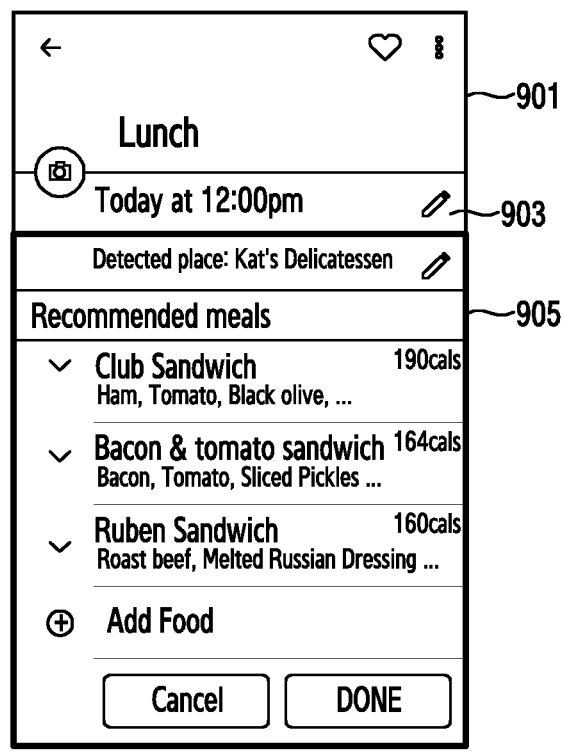
FIG. 9 is a diagram illustrating an example in which an electronic device outputs a food item list of a predetermined restaurant according to example embodiments of the present disclosure.

FIG. 9 is a diagram illustrating an example in which an electronic device outputs a food item list of a predetermined restaurant. The electronic device may be, for example, the electronic device 101 of FIG. 1.

Referring to FIG. 9, the electronic device 101 may display a food item list that a user eats at a meal time input by the user. For example, when a food intake record menu is selected by the user, the electronic device 101 may display a meal time input menu 903 for enabling the user to directly input a meal time, as shown in a screen 901.

When the meal time is input by the user, the electronic device 101 may detect and display the name of a place where the user visits at the input meal time and a food item list 905 corresponding to the place name, based on user location history records.

Figure 10:
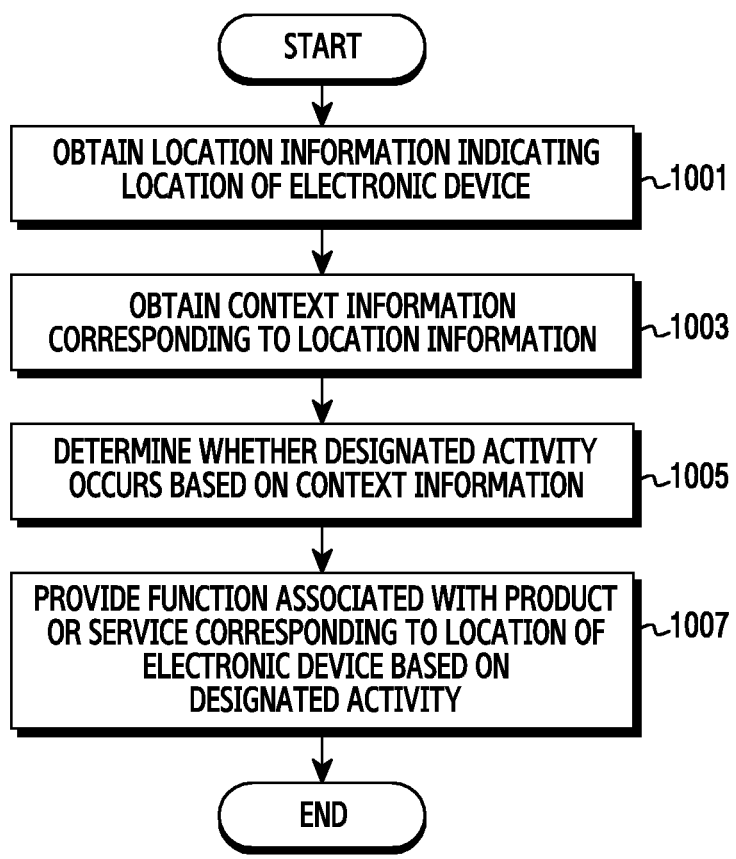
FIG. 10 is a flowchart illustrating an example process in which an electronic device executes a function according to a first example embodiment.

FIG. 10 is a flowchart illustrating an example process in which an electronic device executes a function according to a first example embodiment.

Referring to FIG. 10, an electronic device may include, for example, some or all of the elements of the electronic device 101.

In operation 1001, the electronic device 101 (e.g., the location determining unit 403) obtains location information indicating a location of the electronic device 101. According to an embodiment, the electronic device 101 may obtain location information indicating the location of the electronic device 101 at a predetermined time. For example, the predetermined time may be determined by a user or based on location history records.

In operation 1003, the electronic device 101 (e.g., the user context determining unit 405) obtains user context information corresponding to the location information. For example, the user context information may be information indicating the context of a user who carries the electronic device 101, and may include movement information, adjacent environment information, and biometric information. For example, the movement information may be movement information associated with the user or the electronic device 101. For example, the adjacent environment information may be adjacent environment information associated with the user or the electronic device 101. For example, the biometric information may be biometric information associated with the user.

According to an embodiment, when the location information is obtained, the electronic device 101 may obtain user context information using a sensor module (e.g., the sensor module 240) of the electronic device 101. For example, the user context information corresponding to the location information may be user context information obtained as soon as the location information is obtained, or may be user context information obtained within a predetermined period of time after the location information is obtained. As another example, when the location information is obtained, the electronic device 101 requests user context information from an external electronic device (e.g., the electronic device 102) that is in communication with the electronic device 101, and may receive, from the external electronic device, the user context information obtained through a sensor module of the external electronic device.

In operation 1005, the electronic device 101 (e.g., the user context determining unit 405) determines whether a designated activity occurs based on the user context information. For example, the designated activity may be a predetermined activity that the user performs at a predetermined location.

According to an embodiment, the electronic device 101 may analyze the adjacent environment information out of the user context information, and may estimate user activity performed at a location corresponding to the location information. For example, when the adjacent environment information includes scent information, the electronic device 101 may analyze the scent information, and may determine whether the scent of an adjacent environment is the scent of food. When a result of the determination shows that the scent of the adjacent environment is the scent of food, the electronic device 101 may determine the user activity as food intake activity. For example, the scent information may be obtained through a gas sensor or an olfactory sensor.

As another example, when the adjacent environment information includes scent information, the electronic device 101 may analyze the scent information, and determine a type of food provided in a corresponding location. The electronic device 101 may determine the user activity as food intake activity in association with the determined type of food.

As another example, when the adjacent environment information includes an adjacent environment image, the electronic device 101 may analyze the adjacent environment image, and may determine whether food is included in the adjacent environment image. When a result of the determination shows that food is included in the adjacent environment image, the electronic device 101 may determine the user activity as food intake activity.

According to an embodiment, the electronic device 101 may analyze biometric information out of the user context information, and may estimate user activity performed at a location corresponding to the location information. For example, when the biometric information includes blood sugar information, the electronic device 101 may analyze the blood sugar information, and may determine whether a blood sugar level increases. When a result of the determination shows that a blood sugar level increases, the electronic device 101 may determine the user activity as food intake activity.

As another example, when the biometric information includes calorie information, the electronic device 101 may analyze the calorie information, and may determine whether calorie increases. When a result of the determination shows that calorie increases, the electronic device 101 may determine the user activity as food intake activity. As another example, when the biometric information includes user emotion state information, the electronic device 101 may analyze the user emotion state information, and may determine the emotion state of a user (e.g., sad, angry, gloomy, joyful, delighted, satisfied, or the like). When the determined emotion state is at least one of a joyful state, a delighted state, a satisfied state, and a user is intended to be happy when feeling full and satisfied with having food, the electronic device 101 may determine the user activity as food intake activity.

In operation 1007, the electronic device 101 (e.g., the function executing unit 409) provides a function associated with a product or service corresponding to the location of the electronic device 101, based on the designated activity. According to an embodiment, when user activity is food intake activity, the electronic device 101 may determine a service provided in a corresponding location as a food providing service, and may provide a function associated with the determined food providing service. For example, the function associated with the food providing service may be displaying at least one food item list provided in a corresponding location, and determining and storing an item, which is selected by the user from the displayed food item list, as food eaten in the corresponding location.

Figure 11:
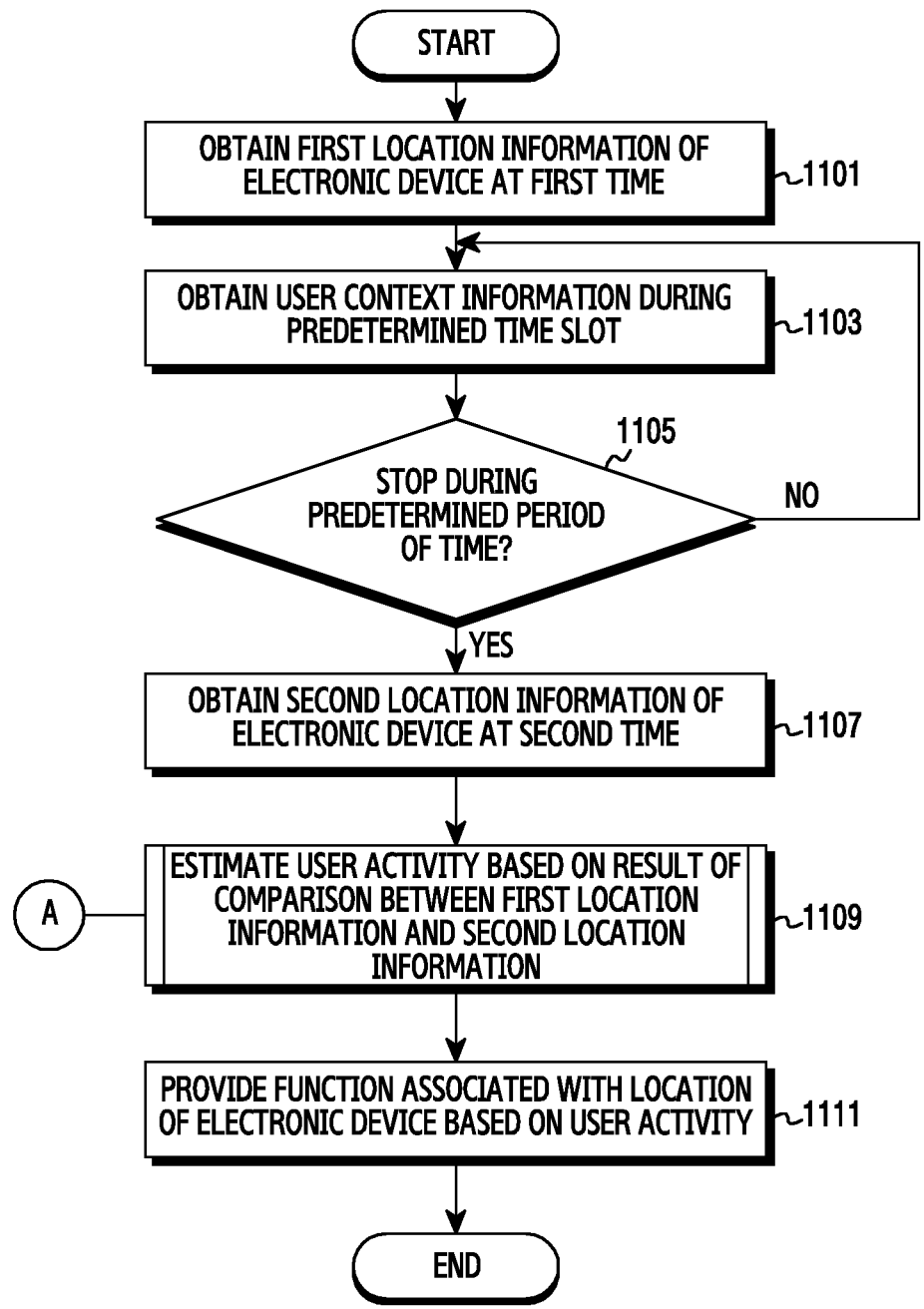
FIG. 11 is a flowchart illustrating an example process in which an electronic device executes a function according to a second example embodiment.

FIG. 11 is a flowchart illustrating an example process in which an electronic device executes a function according to a second example embodiment.

Referring to FIG. 11, an electronic device may include, for example, some or all of the elements of the electronic device 101.

In operation 1101, the electronic device 101 (e.g., the location determining unit 403) obtains first location information of the electronic device 101 at a first time. For example, the first time may be determined in advance by a user or based on location history records. For example, the first time may be a predetermined time before a predetermined time slot or a start time of the predetermined time slot. For example, when the predetermined time slot is a time slot 501 from 11 o'clock to 14 o'clock as shown in FIG. 5A, the first time may be 11 o'clock 503 or a time before 11 o'clock (e.g., 10:30).

For example, the predetermined time slot may be determined in advance by the user or based on location history records. For example, the predetermined time slot may be a time slot when a predetermined activity of the user occurs. For example, the predetermined time slot may be a time slot when a user activity of having a meal occurs. For example, the predetermined time slot may be one of a breakfast time slot, a lunch time slot, and a supper time slot.

According to an embodiment, the electronic device 101 may obtain first location information at the first time using a communication module (e.g., the communication module 220). For example, the first location information may be information indicating the location of the electronic device 101 at the first time. For example, the electronic device 101 may obtain the first location information of the electronic device 101 using the GSNN module 227. For example, the first location information may include the latitude and the longitude indicating the location of the electronic device 101. As another example, the electronic device 101 may obtain the first location information using the cellular module 221, the WiFi module 223, or the NFC module 228.

In operation 1103, the electronic device 101 (e.g., the user context determining unit 405) obtains user context information during a predetermined time slot.

According to an embodiment, the electronic device 101 may obtain user context information using a sensor module (e.g., the sensor module 240) of the electronic device 101. For example, the electronic device 101 may obtain adjacent environment information included in the user context information based on an environment sensor. For example, the electronic device 101 may obtain movement information included in the user context information based on a motion sensor. For example, the electronic device 101 may obtain biometric information included in the user context information based on a biometric sensor.

According to an embodiment, the electronic device 101 may receive user context information from an external electronic device (e.g., the electronic device 102) that is capable of communicating with the electronic device 101. For example, when the electronic device 102 is a wearable device, the electronic device 101 may receive biometric information from the electronic device 102. According to an embodiment, the electronic device 101 may receive some of the user context information from the electronic device 102, may directly obtain some of the user context information, and may obtain new user context information by combining the obtained user context information and the received user context information.

In operation 1105, the electronic device 101 (e.g., the user context determining unit 405) determines whether the user stops during a predetermined period of time. For example, the predetermined period of time may be determined based on a user's predetermined activity corresponding to a predetermined time slot, or may be designated by the user. For example, when the user's predetermined activity is a having-meal activity, the predetermined period of time may be 10 minutes.

According to an embodiment, the electronic device 101 may determine whether the user stops during a predetermined period of time, based on user context information. For example, the electronic device 101 may determine whether the user stops during a predetermined period of time, based on adjacent environment information. For example, when the adjacent environment information includes adjacent image information, the electronic device 101 may analyze the adjacent image information, and may determine whether the user stops during a predetermined period of time.

As another example, when the adjacent environment information includes scent information, the electronic device 101 may analyze the scent information, and may determine whether the user stops during a predetermined period of time. For example, the processor 120 may analyze the scent information and may calculate a variation of a predetermined scent component. When the scent component variation is greater than or equal to a predetermined reference value, it is determined that the user moves. Otherwise, it is determined that the user stops.

As another example, the electronic device 101 may determine whether the user stops during a predetermined period of time based on movement information. For example, the electronic device 101 may analyze the movement information and may calculate a variation in movement. When the calculated movement variation is greater than or equal to a predetermined reference value, it is determined that the user moves. Otherwise, it is determined that the user stops.

In operation 1107, the electronic device 101 (e.g., the user context determining unit 405) obtains second location information of the electronic device 101 at a second time. For example, the second time may be a time corresponding to the case in which the user moves and stops during a predetermined period of time within a predetermined time slot. For example, the second time may be 12 o'clock 505 as illustrated in FIG. 5A.

According to an embodiment, the electronic device 101 may obtain second location information corresponding to the second time using the communication module 220. For example, the second location information may be information indicating the location of the electronic device 101 at the second time.

In operation 1109, the electronic device 101 (e.g., the user context determining unit 405) may estimate user activity based on a result of comparison between the first location information and the second location information. Operation 1109 will be described in detail with reference to FIGS. 12 to 14.

In operation 1111, the electronic device 101 (e.g., the function executing unit 409) provides a function associated with a location of the electronic device 101 based on the user activity. According to an embodiment, the processor 120 may search for a service list provided in a corresponding location based on previously stored location history records, and may display the retrieved service list. For example, when the user activity is food intake activity, the electronic device 101 may search for a food item list provided in the corresponding location based on the location history records, and may display the retrieved food item list. For example, when at least one item is selected by the user from among the display food item list, the electronic device 101 may determine the at least one food included in the selected item as food eaten in the corresponding location. The electronic device 101 may store the food determined to correspond to the corresponding location in a memory (e.g., the memory 130). Alternatively, the electronic device 101 may update the location history records associated with food intake to include the food determined to correspond to the corresponding location.

According to an embodiment, the electronic device 101 may receive a service list provided in the corresponding location from a server, and may display the received service list. For example, the server may be one of the server 106 and the server 108. For example, the server 108 may build a database using service lists provided from a plurality of locations.

For example, the electronic device 101 may obtain and transmit, to the server 108, a request message for requesting a service list corresponding to a corresponding location. For example, the request message may include at least one of location information corresponding to the corresponding location, and a place located in the corresponding location. For example, the server 108 may search a database for a service list corresponding to the corresponding location based on at least one of location information and a place, and may transmit the retrieved service list to the electronic device 101, in response to the request message. For example, the electronic device 101 may receive the service list corresponding to the corresponding location from the server, and may display the received service list.

For example, when at least one service is selected by the user from the displayed service list, the electronic device 101 may determine the selected service as a service provided in the corresponding location. The electronic device 101 may store, in a memory (e.g., the memory 130), the service, which is provided to correspond to the corresponding location. Alternatively, the electronic device 101 may update the location history records to include the service, which is provided to correspond to the corresponding location.

Figure 12:
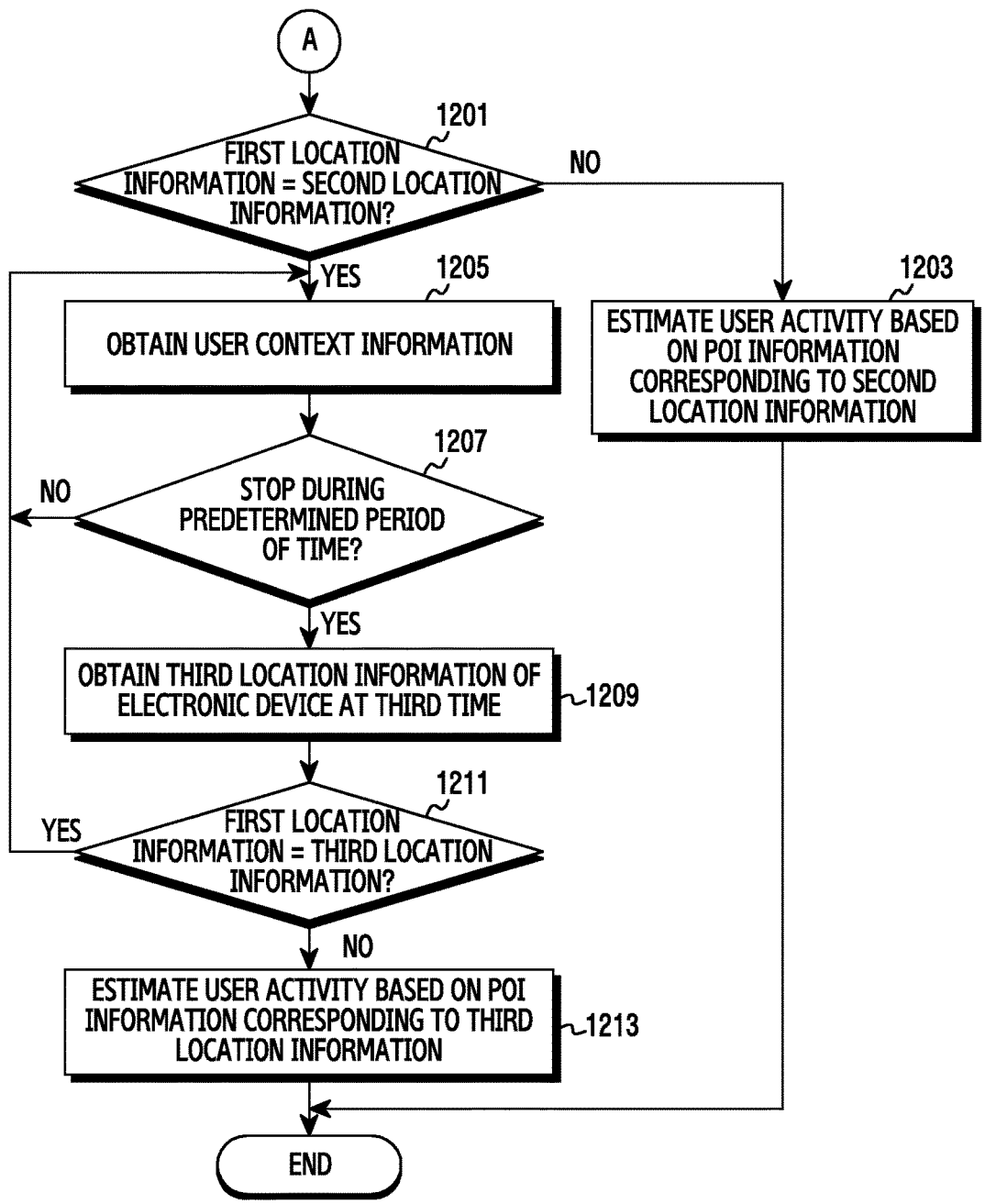
FIG. 12 is a flowchart illustrating an example process in which an electronic device estimates a user activity according to the first example embodiment.

FIG. 12 is a flowchart illustrating an example process in which an electronic device estimates a user activity according to the first example embodiment. An electronic device may include, for example, some or all of the elements of the electronic device 101.

Referring to FIG. 12, the electronic device 101 (e.g., the user context determining unit 405) determines whether first location information is identical to second location information in operation 1201. For example, the electronic device 101 may determine whether the longitude and the latitude of the first location information are identical to the longitude and the latitude of the second location information. When a result of the determination shows that the first location information is identical to the second location information, the electronic device 101 proceeds with operation 1205. Otherwise, the electronic device 101 proceeds with operation 1203.

In operation 1203, the electronic device 101 (e.g., the user context determining unit 405) estimates a user activity based on POI information corresponding to the second location information. For example, the POI information may include a representative name and a property of a predetermined place or a predetermined address. For example, the property of the predetermined place or the predetermined address may be a property of a service provided from the predetermined place or the predetermined address. For example, when the predetermined place is a restaurant, the property of the predetermined place may be a "restaurant".

As another example, the POI information may include a representative name and a property of a predetermined place or a predetermined address, or a service list provided in the predetermined place or the predetermined address. For example, when the property of the predetermined place is a "restaurant", the service list of the predetermined place may be a food item list.

According to an embodiment, the electronic device 101 may receive POI information corresponding to the second location information from a server (e.g., the server 106). For example, the server 106 may be a server that builds a database using POI information corresponding to a plurality of locations.

For example, the electronic device 101 may obtain a POI information request message that requests POI information corresponding to the second location information, and may transmit the obtained POI information request message to the server 106. For example, the POI information request message may store second location information (e.g., latitude and longitude). For example, when the POI information request message is received, the server 106 may search a POI information database for POI information corresponding to the second location information included in the received POI information request message, and may transmit the retrieved POI information to the electronic device 101. For example, the electronic device 101 may receive the POI information corresponding to the second location information from the server 106 in response to the POI information request message.

According to an embodiment, the electronic device 101 may estimate a user activity performed at a second location based on a property of the second location included in the received POI information. For example, the location property determining unit 407 may analyze the received POI information so as to detect the property corresponding to the second location included in the POI information, and may transmit the detected property of the second location to the user context determining unit 405. The user context determining unit 405 may estimate the user activity performed at the second location based on the property of the second location. For example, when the detected property of the second location indicates a "restaurant", the user context determining unit 405 may estimate the user activity performed at the second location as food intake activity (e.g., an activity of having a meal).

In operation 1205, the electronic device 101 (e.g., the user context determining unit 405) obtains user context information during the remaining time slot. According to an embodiment, the processor 120 may obtain user context information using a sensor module (e.g., the sensor module 240) of the electronic device 101. According to an embodiment, the electronic device 101 may receive user context information from the electronic device 102. According to an embodiment, the electronic device 101 may receive some of the user context information from the electronic device 102, may directly obtain some of the user context information, and may obtain new user context information by combining the obtained user context information and the received user context information.

In operation 1207, the electronic device 101 (e.g., the user context determining unit 405) determines whether the user moves and stops during a predetermined period of time based on the user context information. When a result of the determination shows that the user moves and stops during a predetermined period of time, the electronic device 101 proceeds with operation 1209. Otherwise, the electronic device 101 proceeds with operation 1205.

In operation 1209, the electronic device 101 (e.g., the location determining unit 403) obtains third location information of the electronic device 101 at a third time. For example, the third time may be a time corresponding to the case in which the user moves and stops during a predetermined period of time, after the second time within the predetermined time slot. For example, the third time may be 13:30 517 as illustrated in FIG. 5B.

According to an embodiment, the electronic device 101 may obtain third location information corresponding to the third time using the communication module 220. For example, the third location information may be information indicating the location of the electronic device 101 at the third time.

In operation 1211, the electronic device 101 (e.g., the user context determining unit 405) determines whether the first location information is identical to the third location information. When a result of the determination shows that the first location information is identical to the third location information, the electronic device 101 proceeds with operation 1205. Otherwise, the electronic device 101 proceeds with operation 1213.

In operation 1213, the electronic device 101 (e.g., the user context determining unit 405) estimates a user activity based on POI information corresponding to the third location information. According to an embodiment, the electronic device 101 may receive, from the server 106, the POI information corresponding to the third location information, and may estimate the user activity based on a property of a third location included in the received POI information.

Figure 13:
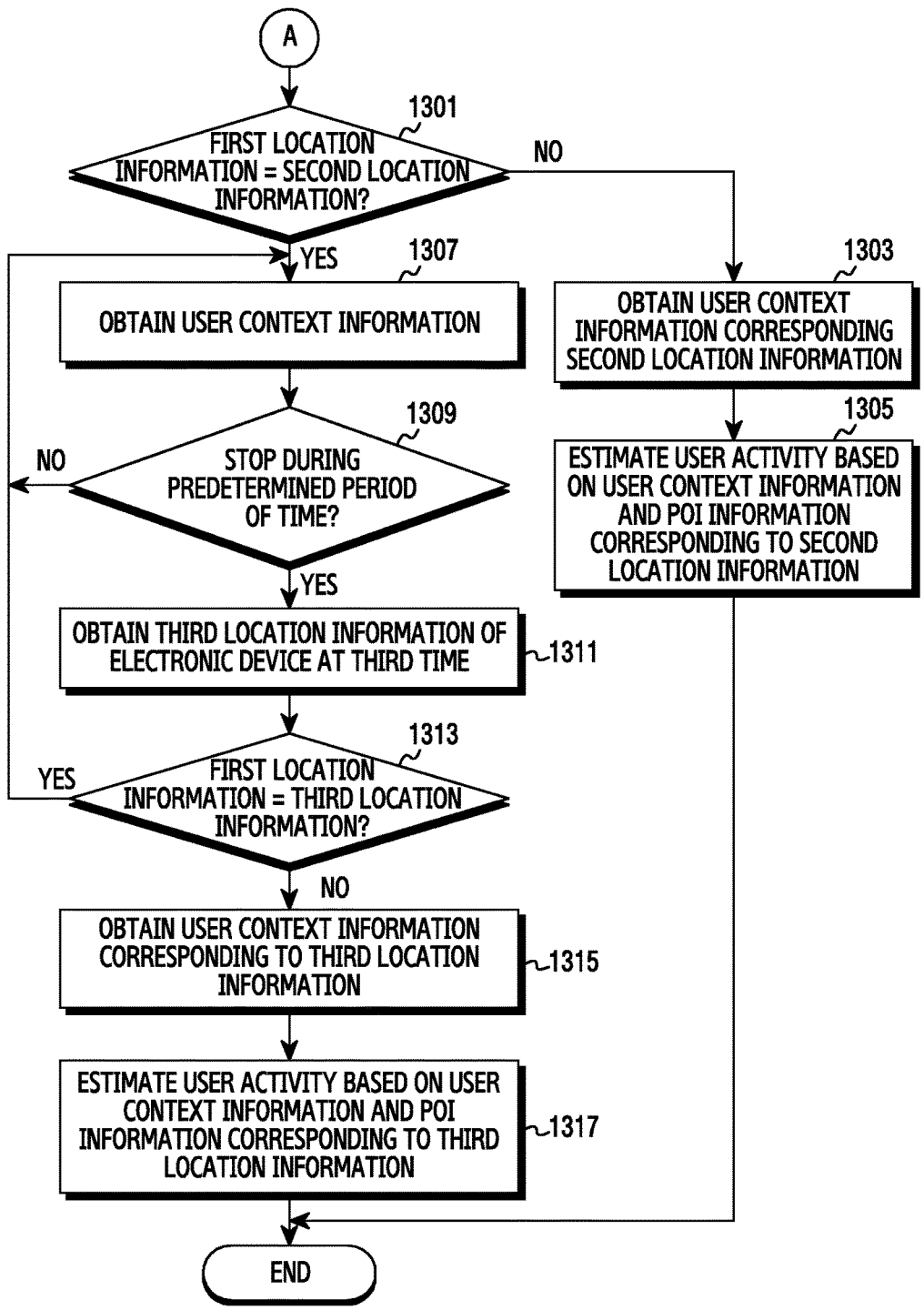
FIG. 13 is a flowchart illustrating an example process in which an electronic device estimates a user activity according to the second example embodiment.

FIG. 13 is a flowchart illustrating an example process in which an electronic device estimates a user activity according to the second example embodiment. An electronic device may include, for example, some or all of the elements of the electronic device 101.

Referring to FIG. 13, the electronic device 101 (e.g., the user context determining unit 405) determines whether first location information is identical to second location information in operation 1301. When a result of the determination shows that the first location information is identical to the second location information, the electronic device 101 proceeds with operation 1305. Otherwise, the electronic device proceeds with operation 1303.

In operation 1303, the electronic device 101 (e.g., the user context determining unit 405) obtains user context information corresponding to the second location information. According to an embodiment, the electronic device 101 may obtain user context information using the sensor module 240. According to an embodiment, the electronic device 101 may receive user context information from the electronic device 102. According to an embodiment, the electronic device 101 may receive some of the user context information from the electronic device 102, may directly obtain some of the user context information, and may obtain new user context information by combining the obtained user context information and the received user context information.

In operation 1305, the electronic device 101 (e.g., the user context determining unit 405) estimates a user activity based on POI information corresponding to the second location information and the user context information. According to an embodiment, the electronic device 101 may estimate a user activity based on a property of the second location included in the received POI information and the user context information.

For example, when the property of the second location indicates a restaurant, the electronic device 101 may analyze scent information included in adjacent environment information of the user context information, and may determine whether the scent of the adjacent environment is the scent of food. When a result of the determination shows that the scent of the adjacent environment is the scent of food, the processor 120 may determine the user activity as food intake activity. As another example, when the property of the second location indicates a restaurant, the electronic device 101 may analyze the scent information and determine a type of food provided in the corresponding location. When the type of food is determined based on a result of the determination, the electronic device 101 may determine the user activity as food intake activity.

As another example, when the property of the second location indicates a restaurant, the electronic device 101 may analyze an adjacent environment image included in the adjacent environment information, and may determine whether food is included in the adjacent environment image. When a result of the determination shows that food is included in the adjacent environment image, the electronic device 101 may determine the user activity as food intake activity.

According to an embodiment, when the property of the second location indicates a restaurant, the electronic device 101 may analyze blood sugar information included in biometric information of the user context information, and may determine whether a blood sugar level increases. For example, an increase in blood sugar may be a result of eating food. When a result of the determination shows that a blood sugar level increases, the electronic device 101 may determine the user activity as food intake activity.

As another example, when the property of the second location indicates a restaurant, the electronic device 101 analyze calorie information included in biometric information, and may determine whether calories increase. For example, an increase in calories may be a result of eating food. When a result of the determination shows that calories increase, the electronic device 101 may determine the user activity as food intake activity.

As another example, when the property of the second location indicates a restaurant, the electronic device 101 may analyze user emotion state information included in biometric information, and may determine the emotion state of a user (e.g., sad, angry, gloomy, joyful, delighted, satisfied, or the like). When the determined emotion state is at least one of a joyful state, a delighted state, a satisfied state, and a user is intended to be happy when feeling full and satisfied with having food, the electronic device 101 may determine the user activity as food intake activity.

In operation 1307, the electronic device 101 (e.g., the user context determining unit 405) obtains user context information during the remaining time slot. In operation 1309, the electronic device 101 determines whether the user moves and stops during a predetermined period of time based on the user context information. When a result of the determination shows that the user moves and stops during a predetermined period of time, the electronic device 101 proceeds with operation 1311, otherwise, proceeds with operation 1307.

In operation 1311, the electronic device 101 (e.g., the location determining unit 403) obtains third location information of the electronic device 101 at a third time. For example, the third time may be a time corresponding to the case in which a user moves and stops during a predetermined period of time, after the second time within the predetermined time slot.

According to an embodiment, the electronic device 101 may obtain third location information corresponding to the third time using the communication module 220. For example, the third location information may be information indicating the location of the electronic device 101 at the third time.

In operation 1313, the electronic device 101 (e.g., the user context determining unit 405) determines whether first location information is identical to the third location information. When a result of the determination shows that the first location information is identical to the third location information, the electronic device 101 proceeds with operation 1307. Otherwise, the electronic device proceeds with operation 1315.

In operation 1315, the electronic device 101 (e.g., the user context determining unit 405) obtains user context information corresponding to the third location information. In operation 1317, the electronic device 101 estimates a user activity based on POI information corresponding to the third location information and the user context information. According to an embodiment, the electronic device 101 may estimate the user activity based on a property of the third location included in the POI information and the user context information.

Figure 14:
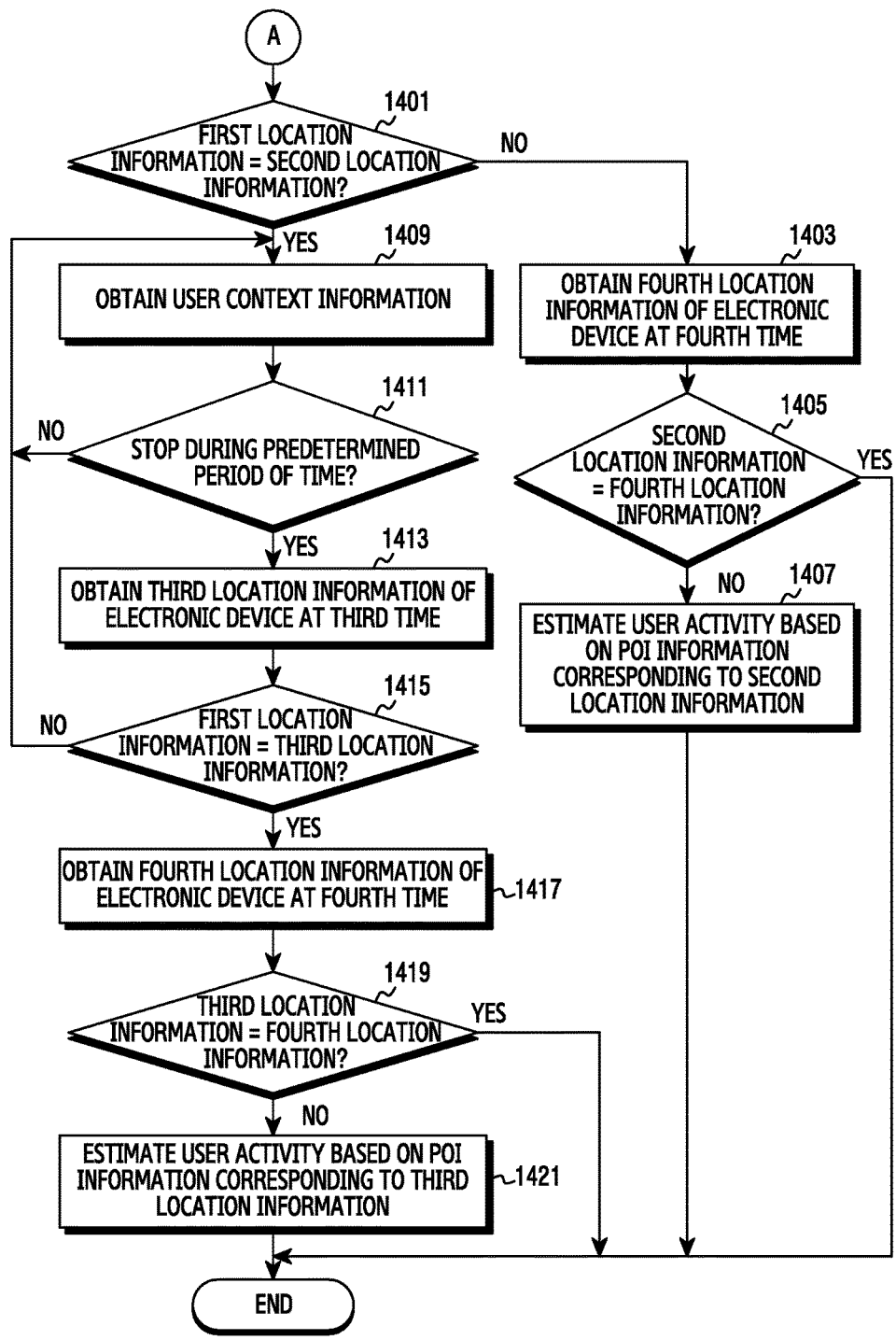
FIG. 14 is a flowchart illustrating an example process in which an electronic device estimates a user activity according to a third example embodiment.

FIG. 14 is a flowchart illustrating an example process in which an electronic device estimates a user activity according to the third example embodiment. An electronic device may include, for example, some or all of the elements of the electronic device 101.

Referring to FIG. 14, the electronic device 101 (e.g., the user context determining unit 405) determines whether first location information is identical to second location information in operation 1401. When a result of the determination shows that the first location information is identical to the second location information, the electronic device 101 proceeds with operation 1403. Otherwise, the electronic device proceeds with operation 1409.

In operation 1403, the electronic device 101 (e.g., the location determining unit 403) obtains fourth location information of the electronic device 101 at a fourth time. For example, the fourth time may be a time at the end of a predetermined time slot, or a time after the predetermined time slot. For example, the fourth time may be 14 o'clock, which is a time 607 at the end of a predetermined time slot 601, as illustrated in FIG. 6A. For example, the fourth location information may be the location of the electronic device 101 at the fourth time.

In operation 1405, the electronic device 101 (e.g., the user context determining unit 405) determines whether the second location information is identical to the fourth location information. When a result of the determination shows that the second location information is identical to the fourth location information, the electronic device 101 terminates an operation of performing a predetermined function associated with a location. Otherwise, the electronic device proceeds with operation 1407.

In operation 1407, the electronic device 101 (e.g., the user context determining unit 405) estimates a user activity based on POI information corresponding to the second location information. According to an embodiment, the electronic device 101 may estimate the user activity based on a property of the second location included in the POI information.

In operation 1409, the electronic device 101 (e.g., the user context determining unit 405) obtains user context information during the remaining time slot. In operation 1411, the electronic device 101 (e.g., the user context determining unit 405) determines whether a user stops during a predetermined period of time based on the user context information. When a result of the determination shows that the user moves and stops during a predetermined period of time, the electronic device 101 proceeds with operation 1413, otherwise, proceeds with operation 1409.

In operation 1413, the electronic device 101 (e.g., the location determining unit 403) obtains third location information of the electronic device 101 at a third time. For example, the third time may be 13:30 617, as illustrated in FIG. 6B.

In operation 1415, the electronic device 101 (e.g., the user context determining unit 405) determines whether the first location information is identical to third location information. When a result of the determination shows that the first location information is identical to the third location information, the electronic device 101 proceeds with operation 1417. Otherwise, the electronic device proceeds with operation 1409.

In operation 1417, the electronic device 101 (e.g., the location determining unit 403) obtains fourth location information of the electronic device 101 at a fourth time. For example, the fourth time may be 14 o'clock, which is a time 619 at the end of a predetermined time slot 611, as illustrated in FIG. 6B.

In operation 1419, the electronic device 101 (e.g., the user context determining unit 405) determines whether the third location information is identical to the fourth location information. When a result of the determination shows that the third location information is identical to the fourth location information, the electronic device 101 terminates an operation of performing a predetermined function associated with a location. Otherwise, the electronic device proceeds with operation 1421.

In operation 1421, the electronic device 101 (e.g., the user context determining unit 405) estimates a user activity based on POI information corresponding to the third location information. According to an embodiment, the electronic device 101 may estimate the user activity based on a property of a third location included in the POI information.

Although it is illustrated that POI information including a property of a predetermined location (e.g., a property of a second or third location) is obtained from the server 106 with reference to FIGS. 12 to 14, the present disclosure may not be limited thereto. According to an embodiment, the electronic device 101 may obtain a property of a predetermined location from payment information. For example, when a card is used for paying for a predetermined service provided in a second location, the electronic device 101 may receive payment information from a card payment approval server. For example, the payment information may include a title and a property of the second location. For example, the electronic device 101 may analyze the received payment information and obtain the property of the second location, and may estimate a user activity at the second location based on the obtained property of the second location. As another example, the electronic device 101 may estimate a user activity at the second location based on the obtained property of the second location and the user context information.

According to an embodiment, an operation method of an electronic device includes: obtaining location information corresponding to the electronic device, obtaining, using the at least one sensor, context information associated with a user of the electronic device in association with a location corresponding to the location information, determining, using the processor, whether a designated activity occurs with respect to a product or a service corresponding to the location based on at least the context information; and providing a function associated with the product or the service based on at least the occurrence of the designated activity.

According to an embodiment, the electronic device may determine that the designated activity occurs when a variation of the location information is less than a designated variation during a designated period of time.

According to an embodiment, the electronic device may include an operation of obtain movement information of the electronic device, and an operation of determining that the designated activity occurs when the movement information corresponds to a designated movement.

According to an embodiment, the electronic device may further include an operation of displaying a list associated with the product or the service.

According to an embodiment, the electronic device may further include an operation of obtaining a list associated with the product or the service from an external electronic device.

According to an embodiment, the electronic device may include: an operation of obtaining first location information at a designated first time associated with the designated activity, an operation of obtaining second location information corresponding to a location that satisfies a predetermined condition, during a predetermined time slot after the first time, and an operation of determining whether the designated activity occurs based on the first location information and the second location information. The location information includes the first location information and the second location information.

According to an embodiment, the electronic device may include an operation of obtaining a property of a location corresponding to the second location information when the first location information is different from the second location information, and an operation of determining that the designated activity occurs when the location property is a location property associated with the designated activity.

According to an embodiment, the electronic device may further include an operation of obtaining third location information after the predetermined time slot when the first location information is different from the second location information, and an operation of determining whether the designated activity occurs based on a result of comparison between the second location information and the third location information.

According to an embodiment, the electronic device may include an operation of obtaining a property of a location corresponding to the second location information when the second location information is different from the third location information, and an operation of determining that the designated activity occurs when the location property is associated with the designated activity.

The term "module" as used herein may, for example, refer to a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of a dedicated processor, a CPU, an Application-Specific Integrated Circuit (ASIC) chip, a Field-Programmable Gate Arrays (FPGA), and a programmable-logic device for performing operations which has been known or are to be developed hereinafter.

According to various example embodiments, at least some of the devices (for example, modules or functions thereof) or the method (for example, operations) according to the present disclosure may be implemented by a command stored in a computer-readable storage medium in a programming module form. The instruction, when executed by a processor (e.g., the processor 120), may cause the one or more processors to execute the function corresponding to the instruction. The computer-readable storage medium may be, for example, the memory 130.

The computer readable recoding medium may include a hard disk, a floppy disk, magnetic media (e.g., a magnetic tape), optical media (e.g., a Compact Disc Read Only Memory (CD-ROM) and a Digital Versatile Disc (DVD)), magneto-optical media (e.g., a floptical disk), a hardware device (e.g., a Read Only Memory (ROM), a Random Access Memory (RAM), a flash memory), and the like. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

The programming module according to the present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Further, some operations may be executed according to another order or may be omitted, or other operations may be added. Various embodiments disclosed herein are provided merely to easily describe technical details of the present disclosure and to aid in the understanding of the present disclosure, and are not intended to limit the scope of the present disclosure. Therefore, it should be construed that all modifications and changes or modified and changed forms based on the technical idea of the present disclosure fall within the scope of the present disclosure.

According to various embodiments, an electronic device displays data associated with a user activity estimated based on location information, thereby increasing convenience of a user when recording the user activity.

According to various embodiments, an electronic device displays data associated with a user activity estimated based on location information and user context information, thereby increasing the convenience of a user when recording the user activity.

What is claimed is:

1. An electronic device, comprising:
   at least one sensor;
   a communication module comprising communication circuitry; and
   a processor,
   wherein the processor is configured to:
      obtain location information of the electronic device at a time within a predetermined time slot when a designated activity occurs;
      obtain, using the at least one sensor, context information associated with a user of the electronic device at a location corresponding to the location information;
      determine whether the designated activity occurs based on the context information; and
      provide a function associated with a product or a service related to the designated activity.

2. The electronic device of claim 1, wherein the processor is configured to determine that the designated activity occurs when a variation of the location information is less than a predetermined variation during a designated period of time.

3. The electronic device of claim 1, wherein the processor is configured to: obtain movement information of the electronic device; and
   determine that the designated activity occurs when the movement information corresponds to a predetermined movement.

4. The electronic device of claim 1, wherein the processor is configured to display a list associated with the product or the service.

5. The electronic device of claim 1, wherein the processor is configured to obtain a list associated with the product or the service from an external electronic device through the communication circuitry.

6. The electronic device of claim 1, wherein the location information includes first location information and second location information, and
   the processor is configured to:
   obtain the first location information at a predetermined first time using the at least one sensor;
   obtain the second location information corresponding to a location that satisfies a predetermined condition, during the predetermined time slot after the first time; and
   determine whether the designated activity occurs based on the first location information and the second location information.

7. The electronic device of claim 6, wherein the processor is configured to:
   obtain a property of a location corresponding to the second location information when the first location information is different from the second location information; and
   determine that the designated activity occurs when the property is a property associated with the designated activity.

8. The electronic device of claim 6, wherein the processor is configured to:
   obtain third location information after the predetermined time slot when the first location information is different from the second location information; and
   determine whether the designated activity occurs based on a result of comparison between the second location information and the third location information.

9. The electronic device of claim 8, wherein the processor is configured to:
   obtain a property of a location corresponding to the second location information when the second location information is different from the third location information; and
   determine that the designated activity occurs when the property is associated with the designated activity.

10. The electronic device of claim 1, wherein the function associated with the product or the service comprises displaying a food item list provided in the location.

11. A method of operating an electronic device, the method comprising:
   obtaining location information of the electronic device at a time within a predetermined time slot when a designated activity occurs;
   obtaining, using at least one sensor, context information associated with a user of the electronic device at a location corresponding to the location information;
   determining, using a processor, whether the designated activity occurs based on the context information; and
   providing a function associated with a product or a service related to the designated activity.

12. The method of claim 11, wherein the determining of whether the designated activity occurs comprises: determining that the designated activity occurs when a variation of the location information is less than a predetermined variation during a designated period of time.

13. The method of claim 11, wherein the determining of whether the designated activity occurs comprises:
   obtaining movement information of the electronic device; and
   determining that the designated activity occurs when the movement information corresponds to a predetermined movement.

14. The method of claim 11, further comprising:
   displaying a list associated with the product or the service.

15. The method of claim 11, further comprising:
   obtaining a list associated with the product or the service from an external electronic device.

16. The method of claim 11, wherein the determining of whether the designated activity occurs comprises:
   obtaining first location information at a predetermined first time associated with the designated activity;

obtaining second location information corresponding to a location that satisfies a predetermined condition, during the predetermined time slot after the first time; and determining whether the designated activity occurs based on the first location information and the second location information, wherein the location information includes the first location information and the second location information.

17. The method of claim 16, wherein the determining of whether the designated activity occurs based on a result of comparison between the first location information and the second location information comprises:

obtaining a property of a location corresponding to the second location information when the first location information is different from the second location information; and determining that the designated activity occurs when the property is a property associated with the designated activity.

18. The method of claim 16, wherein the determining of whether the designated activity occurs based on a result of comparison between the first location information and the second location information comprises:

obtaining third location information after the predetermined time slot when the first location information is different from the second location information; and determining whether the designated activity occurs based on a result of comparison between the second location information and the third location information.

19. The method of claim 18, wherein the determining of whether the designated activity occurs based on a result of comparison between the second location information and the third location information, comprises:

obtaining a property of a location corresponding to the second location information when the second location information is different from the third location information; and determining that the designated activity occurs when the property is associated with the designated activity.

20. A non-transitory computer readable recording medium storing a program which, when executed by a processor, causes the processor to perform operations, the operations comprising:

obtaining location information of an electronic device at a time within a predetermined time slot when a designated activity occurs;

obtaining, using at least one sensor, context information associated with a user of the electronic device at a location corresponding to the location information;

determining, using a processor, whether a designated activity occurs based on the context information; and providing a function associated with a product or a service related to the designated activity.

* * * * *